United States Patent
Sano et al.

(10) Patent No.: US 6,375,742 B2
(45) Date of Patent: *Apr. 23, 2002

(54) APPARATUS FOR PROCESSING PAPER SHEETS TO DECOLOR AN IMAGE FORMED THEREON

(75) Inventors: Kenji Sano; Katsuyuki Naito, both of Tokyo; Satoshi Takayama, Kawasaki; Sawako Fujioka, Tokyo; Tetsuo Okuyama, Yokohama; Shigeru Machida, Kawasaki, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 57 days.

(21) Appl. No.: 09/235,477

(22) Filed: Jan. 22, 1999

Related U.S. Application Data

(63) Continuation-in-part of application No. 08/900,708, filed on Jul. 25, 1997, now Pat. No. 5,922,115.

(30) Foreign Application Priority Data

Jan. 23, 1998 (JP) .............................................. 10-011653

(51) Int. Cl.⁷ .................... B05C 11/00; B05C 13/02; B05D 3/00; B08B 3/10; D06F 43/08

(52) U.S. Cl. .................... 118/600; 118/61; 156/524; 427/140; 427/336; 34/73; 162/5; 134/25.1; 134/64 R; 68/181 R

(58) Field of Search ................... 156/281, 249, 156/535, 524, 584; 118/61, 70, 600, 326; 427/140, 314, 336, 345; 399/250, 251; 34/274, 72, 73, 74, 79, 80; 257/930; 162/4, 5; 134/25.1, 36, 37, 64 R, 84; 68/181 R

(56) References Cited

U.S. PATENT DOCUMENTS

| | | | | |
|---|---|---|---|---|
| 3,158,886 A | * | 12/1964 | Grimes ........................ | 15/100 |
| 3,693,382 A | * | 9/1972 | Grantham ...................... | 68/96 |
| 3,977,218 A | * | 8/1976 | Zucchini ...................... | 68/18 R |
| 4,557,618 A | | 12/1985 | Iwata et al. ................... | 401/34 |
| 4,687,319 A | * | 8/1987 | Mishra ........................ | 355/250 |
| 4,733,272 A | * | 3/1988 | Howe et al. .................. | 355/250 |
| 4,766,462 A | * | 8/1988 | Dyer et al. .................. | 355/250 |
| 5,545,381 A | | 8/1996 | Iida et al. .................... | 422/186 |
| 5,612,766 A | | 3/1997 | Iida et al. ...................... | 399/23 |
| 5,642,550 A | * | 7/1997 | Maruyama et al. ........... | 15/102 |
| 5,799,677 A | * | 9/1998 | Sabatka et al. ................ | 134/76 |

FOREIGN PATENT DOCUMENTS

DE  32 47 804  7/1983

OTHER PUBLICATIONS

Patent Abstract of JP 58–0307651 Feb. 1983.
Patent Abstract of JP 58–217566, Dec. 1983.
Patent Abstract of JP 4–014482, Jan. 1992.
Patent Abstract of JP 7–081236, Mar. 1995.
Patent Abstract of JP 9–165537, Jun. 1997.
Patent Abstract of JP 9–169162, Jun. 1997.

* cited by examiner

*Primary Examiner*—Richard Crispino
*Assistant Examiner*—J. A. Lorengo

(57) ABSTRACT

A decoloring apparatus for an image forming material comprising means for bringing a solvent into contact with an image forming material formed on a paper sheet and containing a color former, a developer and a decolorizer, and means for removing a residual solvent from the paper sheet.

4 Claims, 14 Drawing Sheets

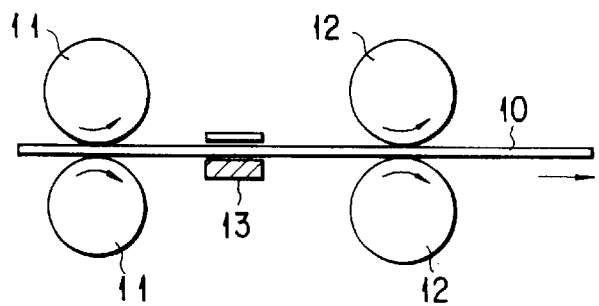
F I G. 1
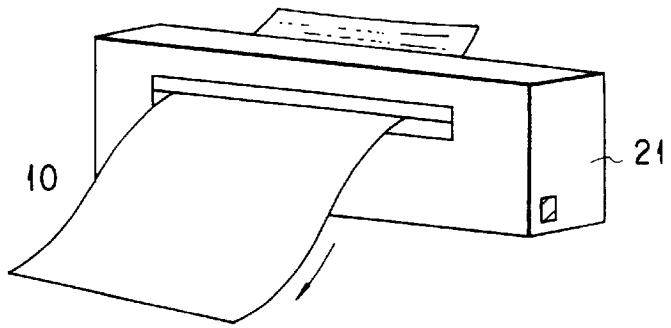
F I G. 2
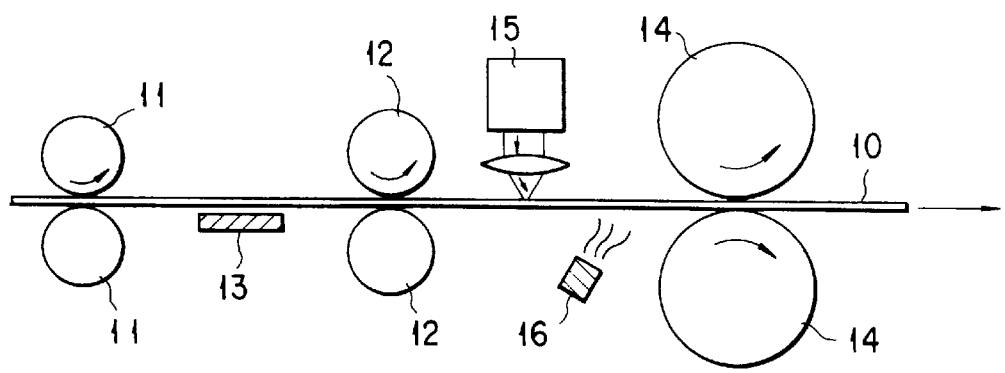
F I G. 3

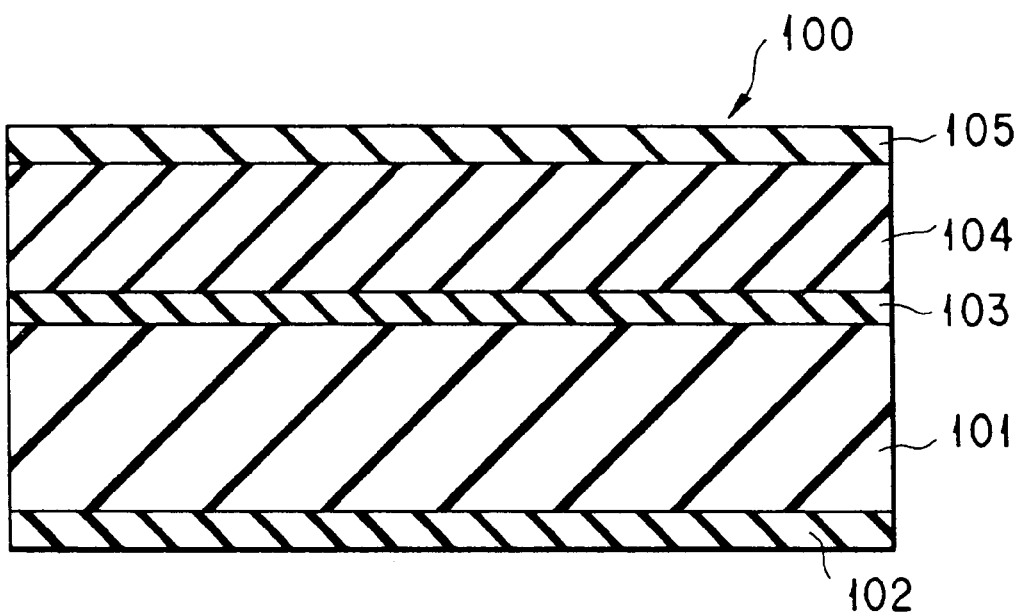
F I G. 9A
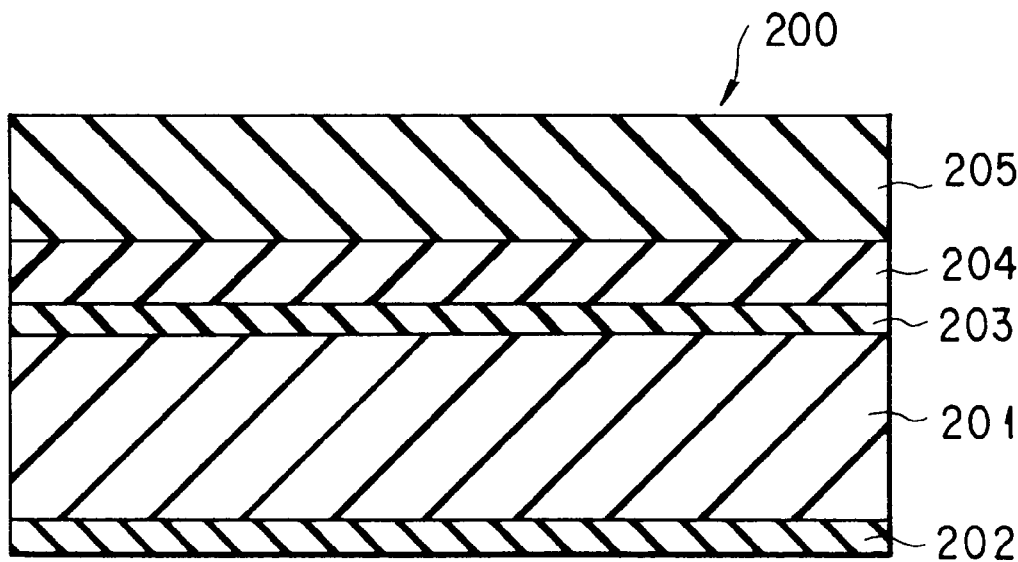
F I G. 9B

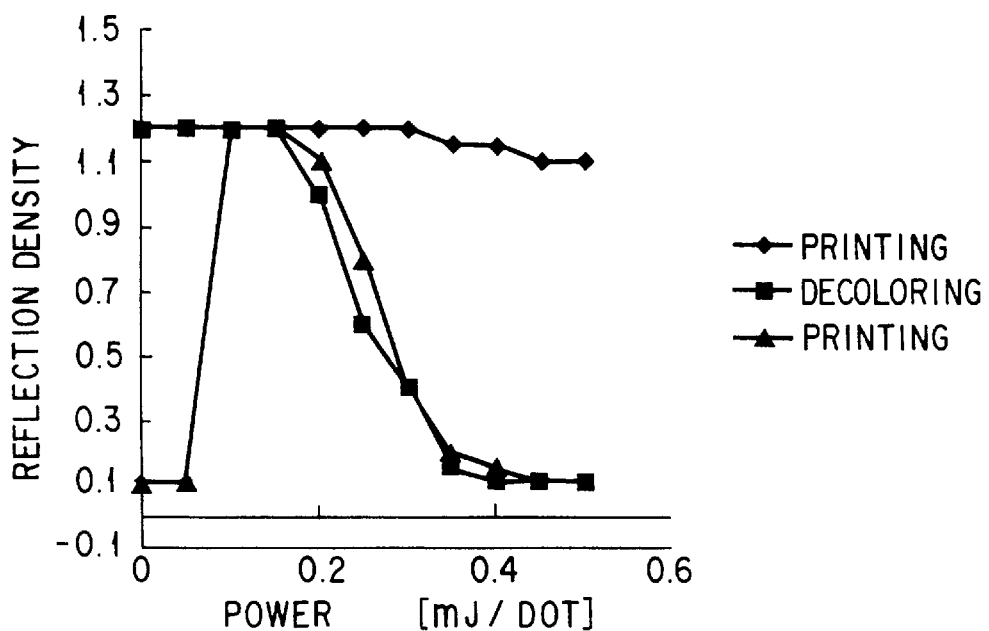
F I G. 12
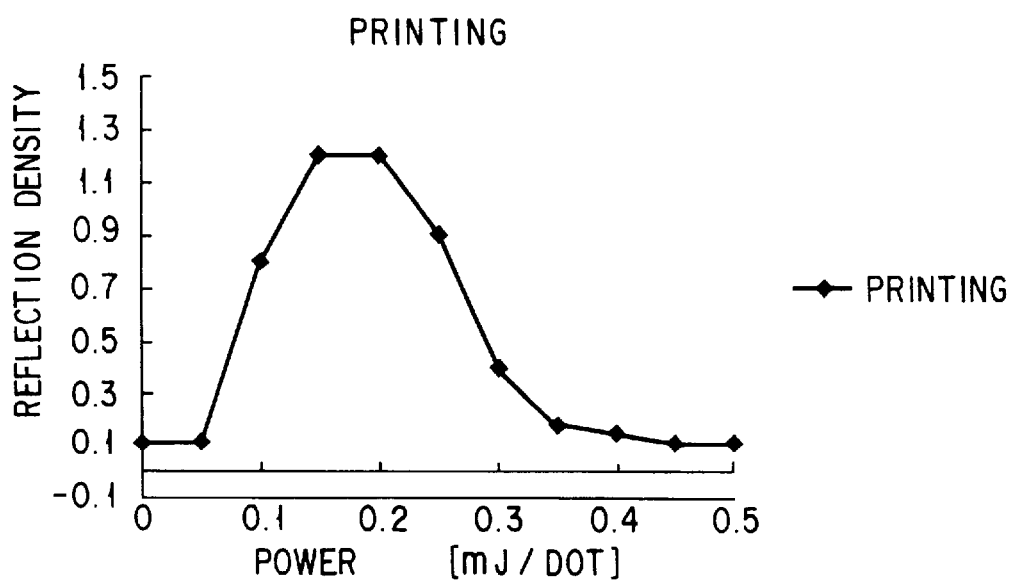
F I G. 13

APPARATUS FOR PROCESSING PAPER SHEETS TO DECOLOR AN IMAGE FORMED THEREON

CROSS-REFERENCE TO RELATED APPLICATIONS

This is a Continuation-in-Part application of U.S. patent application Ser. No. 08/900,708, filed Jul. 25, 1997, now U.S. Pat. No. 5,922,115 issued Jul. 15, 1998 the entire contents of which are incorporated herein by reference.

BACKGROUND OF THE INVENTION

The present invention relates to a decoloring apparatus for a decolorizable image forming material.

In recent years, the amount of various kinds of information has significantly increased by spread of office automation, and so the level of information output has also increased. The information output is represented by display output and hard copy output from a printer onto paper sheets. The display output, however, requires a large scale circuit board in a display unit. This brings about problems of portability and cost. Regarding the hard copy output, a large quantity of paper as a recording medium is being consumed with increase in the information output amount. Therefore, the hard copy output is expected to be a problem with respect to conservation of natural resources. In addition, recycling of paper sheets once printed by a printer or a copying machine is expensive, since much of a bleaching agent and water are required for the recycling and consumption of electric power is enormous. Under such a situation, it is considered to decrease consumption of paper substantially by using decolorizable image forming material to print information on a paper sheet, restoring a blank sheet of paper by decoloring the formed image, and reusing the paper sheet.

Heretofore, ink which can be decolored on heating has been proposed in, for example, Published Unexamined Japanese Patent Application No. 7-81236. The ink includes a color former such as a leuco dye, a developer, and a organophosphoric compound having a decoloring power.

When such image forming material is used, however, decoloring can be done insufficiently and, as a result, a paper sheet is hard to return to the blank state. For this reason, decolorizable image forming material cannot have been put into practical use.

BRIEF SUMMARY OF THE INVENTION

It is, accordingly, an object of the present invention to provide a decoloring apparatus which can easily decolor a decolorizable image forming material and can maintain the decolored state stably, thereby making it possible to reuse paper sheets.

According to an aspect of the present invention, there is provided a decoloring apparatus for an image forming material comprising means for bringing a solvent into contact with an image forming material formed on a paper sheet and containing a color former, a developer and a decolorizer, and means for removing a residual solvent from the paper sheet.

According to another aspect of the present invention, there is provided a decoloring apparatus of an image forming apparatus comprising means for decoloring the image forming material by bringing a solvent containing a decolorizer into contact with the image forming material formed on a paper sheet and containing a color former and a developer, and means for removing a residual solvent from the paper sheet.

According to still another aspect of the present invention, there is provided a decoloring apparatus of an image forming apparatus comprising means for decoloring an image forming material by heating the image forming material formed on a paper sheet and containing a color former, a developer and a decolorizer to a temperature higher than the melting point of the decolorizer, and means for roughening the surface of the image forming material remaining on a surface of the paper sheet.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic view of a mechanism for decoloring the decolorizable ink of the present invention;

FIG. 2 is a perspective view of an apparatus for decoloring the decolorizable ink of the present invention;

FIG. 3 is a schematic view of another mechanism for decoloring the decolorizable ink of the present invention;

FIG. 9A is a sectional view of a sheet on which an ink of the present invention is applied, and FIG. 9B is a sectional view of a sheet on which a decolorizer of the present invention is applied;

FIG. 12 is a graph showing a relationship between the TPH power and the reflection density obtained in Example 9 of the present invention;

FIG. 13 is a graph showing a relationship between the TPH power and the reflection density obtained in Example 10 of the present invention;

DETAILED DESCRIPTION OF THE INVENTION

Figure 4A:
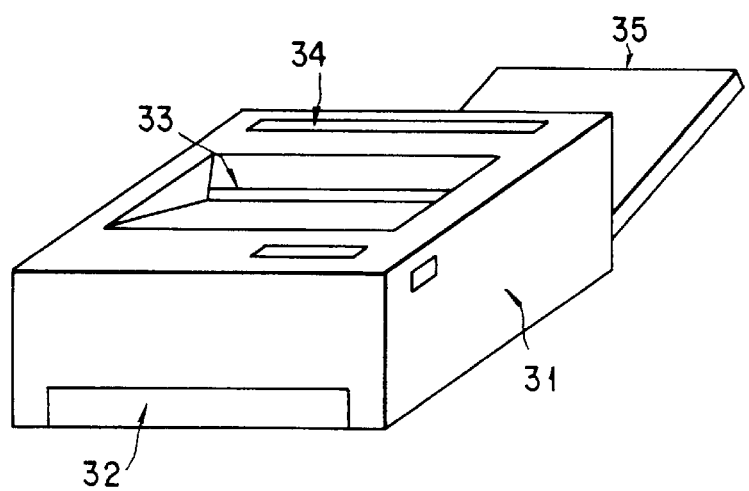
FIG. 4A is a perspective view of an ink-jet printer of the present invention.

The present invention will be described in detail below.

The image forming material of the present invention uses a color former and a developer in combination with a decolorizer to enable decoloring after it is printed.

First, functions of basic components used in the image forming material of the present invention will be described. A color former is a precursor compound of a coloring matter which forms colored information such as characters and graphics, a developer is a compound which develops a color former by the interaction (primarily, exchange of an electron or proton) between the developer and the color former, and a decolorizer is a compound having a property that preferentially dissolves one of the color former and the developer when they are melted.

When the three-component system is in a solidified state, it is possible for the system to assume one of the following two particular states:

(1) A colored state in which the decolorizer is mixed with the color former and the developer in an amount that corresponds to the equilibrium solubility, and the excessive color former and developer over the equilibrium solubility are phase-separated from the decolorizer, with the result that the interaction between the color former and the developer is increased to develop a color.

(2) A decolored state in which the decolorizer dissolves a larger amount of the color former and the developer than the equilibrium solubility, with the result that the interaction between the color former and the developer is decreased to lose the color.

Changes between colored and decolored states of the three-component system are effected in accordance with a principle described below. It is assumed in the following description that, when the above mentioned three-component system is melted into a fluidized condition, the decolorizer preferentially dissolves the developer. At room temperature, a condition in which a phase of the color former and the developer is separated from a phase of the decolorizer is close to equilibrium. In this condition, the system is in a colored state, since the color former and the developer interact with each other. When the three-component system in the colored state is heated up to the melting point or higher to be a fluidized condition, the developer is preferentially dissolved into the decolorizer. As a result, the interaction between the developer and the color former is lost, leading to decoloring. When the three-component system is forcedly solidified by cooling rapidly from the molten state, the decolorizer takes the developer into itself in a large amount exceeding the equilibrium solubility. As a result, the system is turned amorphous and colorless at room temperature. Although the amorphous three-component system is under a non-equilibrium state in a relative sense, the amorphous system exhibits a sufficiently long life at temperatures not higher than a glass transition point Tg. Therefore, if Tg is not lower than room temperature, the system does not easily converted from the amorphous state to the equilibrium state.

Next, compounds used as components of the image forming material of the present invention are described below.

The color former used in the present invention includes electron-donating organic substances such as leucoauramines, diarylphtalides, polyarylcarbinoles, acylauramines, arylauramines, Rohdamine B lactams, indolines, spiropyrans and fluorans.

To be more specific, the color former includes Crystal Violet lactone (CVL), Malakite Green lactone, 2-anilino-6-(N-cyclohexyl-N-methylamino)-3-methylfluoran, 2-anilino-3-methyl-6-(N-methyl-N-propyl-amino)fluoran, 3-[4-(4-phenylaminophenyl)aminophenyl]-amino-6-methyl-7-chlorofluoran, 2-anilino-6-(N-methyl-N-isobutylamino)-3-methylfluoran, 2-anilino-6-(dibutylamino)-3-methylfluoran, 3-chloro-6-(cyclohexylamino)-fluoran, 2-chloro-6-(diethylamino)fluoran, 7-(N,N-diethylamino)-3-(N,N-diethylamino)fluoran, 3,6-bis(diethylamino)fluoran, γ-(4'-nitroanilino)lactam, 3-diethylaminobenzo[a]-fluoran, 3-dietylamino-6-methyl-7-aminofluoran, 3-diethylamino-7-xylidino-fluoran, 3-(4-diethylamino-2-ethoxyphenyl)-3-(1-ethyl-2-methylindole-3-yl)-4-azaphthalide, 3-(4-diethylaminophenyl)-3-(1-ethyl-2-methylindole-3-yl) phthalide, 3-diethylamino-7-chloroanilinofluoran, 3-diethylamino-7,8-benzofluoran, 3,3-bis(1-n-butyl-2-methylindole-3-yl)phthalide, 3,6-dimethylethoxyfluoran, 3,6-diethylamino-6-methoxy-7-aminofluoran, DEPM, ATP, ETAC, 2-(2-chloroanilino)-6-dibutylaminofluoran, Crystal Violet carbinol, Malachite Green carbinol, N-(2,3-dichlorophenyl)leucoauramine, N-benzoylauramine, Rhodamine B lactam, N-acetylauramine, N-phenylauramine, 2-(phenyliminoethanedilydene)-3,3-dimethylindoline, N,3,3-trimethylindolinobenzospiropyran, 8'-methoxy-N,3,3-trimethylindolinobenzospiropyran, 3-diethylamino-6-methyl-7-chlorofluoran, 3-diethylamino-7-methoxyfluoran, 3-diethyamino-6-benzyloxyfluoran, 1,2-benzo-6-diethyaminofluoran, 3,6-di-p-toluidino-4,5-dimetylfluoran, phenylhydrazide-γ-lactam, and 3-amino-5-methylfluoran. The color former compounds exemplified above can be used singly or in a combination of two or more species. If color formers are selected properly, a variety of colored states can be obtained, and thus formation of multicolor image can be attained.

The developer used in the present invention includes acidic compounds, such as phenols, metal phenolates, metal carboxylates, benzophenones, sulfonic acids, sulfonates, phosphoric acids, metal phosphates, acidic phosphoric esters, acidic phosphoric ester metal salts, phosphorus acids, and metal phosphites. The developer compounds can be used singly or in a combination of two or more species.

The decolorizer used in the present invention should desirably have a good colorlessness in an amorphous state. If the decolorizer is more colorless and transparent in the amorphous state, a paper sheet is turned white closer to the original paper sheet when the image forming material on the paper sheet is decolored. The decolorizer shows such characteristics should preferably have a high molecular weight and a small enthalpy change of melting ΔH of the crystal per weight and, thus, should be low in maximum crystallization velocity (MCV). If the crystal of decolorizer has a small enthalpy change of melting ΔH, the heat energy required for melting the crystal is decreased, which is desirable in regard to energy saving. In order to increase solubility of the developer in the decolorizer, it is desirable that the decolorizer has a high affinity with the developer. Therefore, the decolorizer should desirably be a compound having, for example, an alcoholic hydroxyl group. From a view point of a storage stability of the three-component system in a decolored state, a glass transition point Tg of the three-component system should be not lower than room temperature (25° C.), and preferably be not lower than 50° C. In order to satisfy the above condition, the glass transition point Tg of the decolorizer should also be not lower than room temperature (25° C), and preferably be not lower than 50° C. On the other hand, the crystallization temperature of a decolorizer is in the range of the glass transition point Tg to the melting point Tm of the three-component system. Therefore, in order to accelerate decoloring, the glass transition point Tg of a decolorizer should preferably be not higher than 150° C.

As a preferable decolorizer that satisfies above conditions, the following compounds classified in the groups (a) to (c) are enumerated.

(a) Sterol compounds: Specific examples are cholesterol, stigmasterol, pregnenolone, methylandrostenediol, estradiol benzoate, epiandrostene, stenolone, β-sitosterol, pregnenolone acetate, β-chorestanol, 5,16-pregnadiene-3β-ol-20-one, 5α-pregnen-3β-ol-20-one, 5-pregnen-3β, 17-diol-20-one 21-acetate, 5-pregnen-3β, 17-diol-20-one 17-acetate, 5-pregnen-3β, 21-diol-20-one 21-acetate, 5-pregnen-3β, 17-diol diacetate, rockogenin, thigogenin, esmiragenin, heckogenin, diosgenin and their derivatives. These decolorizers can be used singly or in a combination of two or more species. Particularly preferable decolorizer which can give a stable decolored state includes methylandrostenediol, heckogenin, rockogenin, thigogenin, diosgenin and esmiragenin.

When a three-component system containing the decolorizer selected from the above group in an amorphous state is heated to a temperature higher than a glass transition point, a diffusion velocity of a developer is rapidly increased and a motion of phase separation between the developer and the decolorizer is accelerated in a direction of returning to a equilibrium. If the three-component system heated to a temperature higher than the crystallizing temperature and lower than the melting point is then slowly cooled down to room temperature, the system reaches to a stable phase separated state closer to a equilibrium, at which the system returns to a colored state. Therefore, the three-component system including the decolorizer of the (a) group can repeat reversible changes between colored and decolored states. In this sense, the decolorizer classified in the (a) group is sometimes referred to, hereinafter, as a "reversible decolorizer". A rewritable recording medium which utilizes such reversible changes has been proposed. However, the present invention has an object to provide decolorizable image forming material whose color is removed after printed, and therefore the reversibility between colored and decolored states is not substantially required in the present invention with the exception of some special applications.

(b) Cholic acid, lithocholic acid, testosterone, cortisone and their derivatives: Specific examples are cholic acid, methyl cholate, sodium cholate, lithocholic acid, methyl lithocholate, sodium lithocholate, hydroxycholic acid, methyl hydroxycholate, hyodeoxycholic acid, methyl hyodeoxycholate, testosterone, methyltestosterone, 11α-hydroxymethyltestosterone, hydrocortisone, cholesterol methyl carbonate, and α-cholestanol. Among them, compounds having two or more hydroxyl groups are especially preferred.

The decolorizer of the (b) group, compared to that of the (a) group, has a stronger affinity to the developer when they are melted, in other words, has a very high compatibility thereto. In addition, the decolorizer of the (b) group has a higher inclination of being amorphous, and therefore a phase separation is hard to occur even after the three-component system is solidified. In this sense, the decolorizer classified in the (b) group is sometimes referred to as a "compatible decolorizer" hereinafter. For this reason, the three-component system including the decolorizer of the (b) group can maintain a stabler decolored state.

(c) Non-aromatic cyclic compounds of a five-membered or larger ring having one or more hydroxyl groups: The decolorizer of the (c) group should have a melting point of 50° C. or higher. Specific examples are alicyclic monohydric alcohols such as cyclododecanol; alicyclic dihydric alcohols such as 1,4-cyclohexandiol, 1,2-cyclohexandiol and 1,2-cyclododecandiol; saccharides and their derivatives such as glucose and saccharose; alcohols having a ring structure such as 1,2:5,6-diisopropylidene-D-mannitol.

The decolorizer of the (c) group functions effectively when it is used together with the decolorizer of the (a) group, although it may be used singly. That is, the decolorizer of the (c) group has a strong affinity with the decolorizer of the (a) group, and therefore a phase separation is hard to occur even after the system is solidified. In this sense, the decolorizer of the (c) group is sometimes referred to as a "phase separation inhibiting decolorizer" or "phase separation inhibitor" hereinafter. The system including the decolorizer of the (c) group can also maintain a stabler decolored state.

The decolorizer of the (c) group, i.e., the phase separation inhibitor, can be further classified into two types:

(c1) A type having a relatively high melting point and a relatively high glass transition point and, thus, likely to become amorphous at room temperature. Typical examples of the decolorizer of the (c1) type are saccharides and their derivatives. The decolorizer of this type is hereinafter referred to as a highly amorphous phase separation inhibitor.

(c2) A type having a relatively low melting point and a relatively low glass transition point and, thus, unlikely to become amorphous at room temperature with possiblity to form microcrystals, but having high compatibility with the developer under a fluidized state. Typical examples of the decolorizer of the (c2) type are alicyclic alcohols. The decolorizer of this type is hereinafter referred to as a slightly amorphous phase separation inhibitor.

Let us describe the behavior of an image forming material containing a color former, a developer and a highly amorphous phase separation inhibitor when it is heated and cooled. If an image forming material which develops a color at room temperature is heated to a temperature higher than a melting point of the highly amorphous phase separation inhibitor, the developer is dissolved in the highly amorphous phase separation inhibitor so as to lose interaction with the color former and, thus, to present a decolored state. If the image forming material under a molten state is solidified by cooling, the highly amorphous phase separation inhibitor takes in the developer in an amount exceeding an equilibrium solubility so as to be made amorphous and decolored at room temperature. In this fashion, the highly amorphous phase separation inhibitor functions as a decolorizer even when used singly. In addition, since the highly amorphous phase separation inhibitor is likely to become amorphous at room temperature, the decolored state can be maintained over a long period of time. It should be noted, however, that, where the phase separation inhibitor under a fluidized state fails to exhibit a sufficiently high compatibility with the developer at room temperature, a satisfactory difference in image density may not be obtained between the developed state and the decolored state.

Let us describe the behavior of an image forming material containing a color former, a developer and a slightly amorphous phase separation inhibitor when it is heated and cooled. If the image forming material, which develops a color under room temperature, is heated to a temperature higher than the melting point of the slightly amorphous phase separation inhibitor, a considerably large amount of the developer is dissolved in the slightly amorphous phase separation inhibitor so as to lose interaction with the color former and, thus, to be decolored. However, even if the image forming material under a molten state is solidified by cooling, the slightly amorphous phase separation inhibitor is unlikely to become amorphous. Also, it is possible for the inhibitor to be microcrystallized. It follows that the image forming material is brought back to the original color-developed state. In this fashion, the slightly amorphous phase separation inhibitor does not function as a decolorizer when used singly.

In the present invention, the highly amorphous phase separation inhibitor and the slightly amorphous phase separation inhibitor are used in combination as a decolorizer so as to utilize the merits of both phase separation inhibitors. Let us describe the behavior of an image forming material containing a color former, a developer, a highly amorphous phase separation inhibitor and a slightly amorphous phase separation inhibitor when it is heated and cooled. At room temperature Tr, an image is formed under a state that a mixed phase of the color former, developer and slightly amorphous separation inhibitor is separated from a phase of the highly amorphous phase separation inhibitor. If the composition system is heated to a temperature higher than a melting point Tml of the slightly amorphous phase separation inhibitor, the developer is dissolved in a fluidized slightly amorphous phase separation inhibitor so as to lose interaction with the color former and, thus, to be decolored. If the composition system is further heated to a temperature higher than a melting point Tm2 of the highly amorphous phase separation inhibitor, the developer and the slightly amorphous phase separation inhibitor are dissolved in the highly amorphous phase separation inhibitor. If the composition system in the molten state is solidified by cooling, the highly amorphous phase separation inhibitor causes the slightly amorphous phase separation inhibitor to take in the developer in an amount exceeding an equilibrium solubility, resulting in decoloration at room temperature. It should be noted that the highly amorphous phase separation inhibitor, which is highly amorphous, inhibits the crystallization of the slightly amorphous phase separation inhibitor so as to suppress the phase separation of the composition system. It follows that the decolored state of the image forming material is maintained with a very high stability.

Cyclic sugar alcohols can be used in the present invention as a suitable highly amorphous phase separation inhibitor. The specific compounds of the cyclic sugar alcohols used in the present invention include, for example, D-glucose, D-mannose, D-galactose, D-fructose, L-sorbose, L-rhamnose, L-fucose, D-ribodesose, α-D-glucose pentaacetate, acetoglucose, diacetone-D-glucose, D-glucuronic acid, D-galacturonic acid, D-glucosamie, D-fructosamine, D-isosaccharic acid, vitamin C, erutorubic acid, trehalose, saccharose, maltose, cellobiose, gentiobiose, lactose, melibiose, raffinose, gentianose, melizitose, stachyose, methyl α-glucopyranoside, salicin, amygdalin, and euxanthic acid. These compounds can be used singly or in the form of a mixture of at least two compounds.

The slightly amorphous phase separation inhibitor adapted for use in the present invention includes, for example, non-aromatic cyclic compounds other than cyclic sugar alcohols, said non-aromatic cyclic compounds having a five-membered or larger ring and having a hydroxyl group, and derivatives of cyclic sugar alcohols, the typical examples being terpene alcohols. To be more specific, the slightly amorphous phase separation inhibitor used in the present invention includes, for example, alicyclic monohydric alcohols such as cyclododecanol, hexahydrosalicylic acid, menthol, isomenthol, neomenthol, neoisomenthol, carbomenthol, α-carbomenthol, piperithol, α-terpineol, β-terpineol, γ-terpineol, 1-p-menthene-4-ol, isopulegol, dihydrocarveol and carveol; alicyclic polyhydric alcohols such as 1,4-cyclohexanediol, 1,2-cyclohexanediol, phloroglucitol, quercitol, inositol, 1,2-cyclododecane diol, quinic acid, 1,4-terpene, 1,8-terpene, pinol hydrate, and betulin; polycyclic alcohol derivatives such as borneol, isoborneol, adamantanol, fenchol, camphor, and isosorbide; and derivatives of cyclic sugar alcohols such as 1,2:5,6-diisopropylidene-D-mannitol. Further, it is possible to use materials of a molecular structure having a large steric hindrance, which is obtained by the reaction between the cyclic alcohols exemplified above and another compound having a cyclic molecular structure. In the case of using the particular material, it is possible to improve the temperature stability of the image forming material under a decolored state. For example, the ester between isosorbide and cyclohexane dicarboxylic acid can be used as a suitable material of the slightly amorphous phase separation inhibitor. The compounds exemplified above can be used singly or in the form of a mixture of at least two compounds.

In terms of the effects given to the environment, it is desirable for the image forming material of the present invention to contain as a decolorizer biodegradable sterol compounds, cyclic sugar alcohols or derivatives thereof, which are extracted from animals, plants or fungi.

The biodegradable sterols extracted from animals, plants or fungi include, for example, various animal sterins, plant sterins, and fungi sterins. To be more specific, the animal sterins used in the present invention include, for example, cholesterol, lanosterol, agnosterol, cholestanol, coprostanol, ostreasterol, actiniasterol, spongosterol, and clionasterol. The bile acid used in the present invention includes, for example, cholanoic acid, cholic acid, hyodeoxycholic acid, and lithocholic acid. The plant sterins used in the present invention include, for example, stegmasterol, α-sitosterol, β-sitosterol, γ-sitosterol, brassicasterol, and vitamin D. Further, the fungi sterins used in the present invention include, for example, ergosterol. These sterol compounds can be used singly or in the form of a mixture of at least two compounds. It is also possible to use, for example, lanolin alcohol which is originally a mixture.

On the other hand, it is not desirable to use toxic materials such as digilanide, digoxigenin, digitoxin, digitoxigenin, bufotalin, bufotoxin, strophanthin, strophanthidin and scillaren.

Preferable mixing ratio of the color former, the developer and the decolorizer in the image forming material of the present invention is as follows. It is desirable to use the developer in an amount of 0.1 to 10 parts by weight, preferably 1 to 2 parts by weight, relative to 1 part by weight of the color former. If the amount of the developer is smaller than 0.1 parts by weight, coloring of the image forming material by the interaction between the color former and the developer becomes insufficient. If the amount of the developer exceeds 10 parts by weight, it becomes difficult to decrease sufficiently the interaction between these compounds. It is desirable to use the decolorizer in an amount of 1 to 200 parts by weight, preferably 10 to 100 parts by weight, relative to 1 part by weight of the color former. If the amount of the decolorizer is smaller than 1 part by weight, changes between the colored and decolored states cannot occur easily. If the amount of decolorizer exceeds 200 parts by weight, coloring of the image forming material becomes insufficient.

The image forming materiel of the present invention can be used various form. For example, it can be used as ink for thermal printer; ink for an ink-jet printer; a toner for plain paper copier (PPC) and laser beam printer, etc.; printing ink for screen printing and typographic printing; ink for writing implements such as ball-point pens and fountain pens. The ink for thermal printer comprises a color former, a developer, a decolorizer and wax, and is applied to a plastic sheet. The ink for an ink-jet printer comprises a color former, a developer and a decolorizer, which are dispersed in a solvent. The toner is prepared by pulverizing a composition containing a color former, a developer, a decolorizer and a binder. In this case, typical binders are polystyrene, styrene acrylate copolymer, polyester and epoxy resin. The image forming material of the present invention can be printed onto various types of paper sheet. The medium for forming an image is not restricted to a paper sheet. The image forming material can be printed onto, for example, a sheet for a overhead projector, etc.

The image forming material of the present invention can be applied to uses in which decoloring is simply required without reusing paper sheets. For example, the image forming material is applicable to processing post cards in post offices, wherein the addresses handwritten on post cards are read with an image reader to obtain bar code corresponding to the reading in a post office, bars are then printed on the post cards with the image forming material of the present invention, the post cards are classified with a machine according to the bar code, the classified post cards are sent to another post offices, the post cards are sorted in order of postal delivery in each post office, and then the bars are decolored by heating. In such a manner, post cards can be delivered without any trace of the processing in the post offices. In a manner similar to this, the decolorizable image forming material of the present invention can generally be used for physical distribution. In this purpose, substances other than paper may be printed.

For decoloration of the color developed image forming material, used are a method of decoloring by heating and melting the image forming material and a method of decoloring by bringing the image forming material into contact with a solvent.

In the method of decoloring by heating, the decoloration is performed according to the principle as described above. A heating means for decoloring the image forming material may have any form. More specifically, a thermal printer head (TPH), a thermal bar, a hot stamp and a heat roller can be used. Alternatively, heating may performed by a infrared lamp or hot air.

In the method of decoloring by a solvent, the decoloration is performed according to the following principle. When the image forming material in a color developed state is brought into contact with a solvent, the developer is mixed with a slightly amorphous phase separation inhibitor, and further these components are mixed with a highly amorphous phase separation inhibitor. The developer loses interaction with the color former and, thus, the image forming material is decolored. When the solvent is removed, the highly amorphous phase separation inhibitor causes the slightly amorphous phase separation inhibitor to take in the developer in an amount exceeding an equilibrium solubility, so that the decolored state of the image forming material is fixed. This decolored state is very stable at room temperature.

If the image is decolored by using a solvent, quality of the paper sheet after decoloration is improved. The reason is as follows. That is, when the image forming material is decolored by contact with a solvent and then the solvent which has been contained in the binder is evaporated, the binder is made porus. Since light is scattered on the surface of the porus binder, reflection on the binder is diminished. In addition, the binder and the other components are spread out widely, so that the boundary between portions where the image forming material is present and is not present becomes unclear. Therefor, the remaining image forming material is hardly recognized either by eye or hand.

By any of the above methods, there are no needs for a bleaching agent and water for recycling of paper, and therefore recycling cost is decreased. At the same time, decrease in paper consumption contributes to conservation of forest resources.

Where the image forming material of the present invention is used as ink, a composition containing the color former, developer and decolorizer, which is in a colored state, is dispersed in a solvent. Such decolorizable ink can be used as ink for ball-point pens and fountain pens, printer ink for ink-jet printer, and printing ink for screen printing and typographic printing. The solvent used in the decolorizable ink is preferably water. Although the ink composition may be dispersed in the solvent by the help of a surfactant, it is preferred that microcapsules having a structure in which the ink composition is covered by a polymer shell are dispersed in the solvent. In order to improve weather resistance and ultraviolet resistance, it is preferable to add a ultraviolet absorber to the ink composition contained in the microcapsules or to use a ultraviolet absorbing polymer as a shell material of microcapsule. In preparing microcapsules, it is desirable to use the polymer in an amount of 0.01 to 100 parts by weight, preferably 0.1 to 5% parts by weight, relative to 1 part by weight of the decolorizer.

The concentration of the ink composition in the solvent is preferably in the range of 0.1 to 10 wt %, although the concentration varies depending on purposes. If the concentration is smaller than 0.1 wt %, sufficient print density cannot be obtained. If the concentration exceeds 10 wt %, the viscosity of the ink becomes too high to use, for example, as ink for a ink-jet printer. The ink composition dispersed in the solvent should preferably be in the form of particles of sub-micron in size not including particles of 10 $\mu$m or more.

Where the image forming material of the present invention is used as a toner, the color former, developer and decolorizer are dispersed in a binder. It is desirable to control appropriately the binder content of the image forming material in accordance with the average molecular weight of the binder in the toner use. It should be noted that, where an image is decolored by using a solvent, the affinity between the solvent and the binder is decreased with increase in the average molecular weight of the binder, making it desirable to control the binder content in accordance with the average molecular weight of the binder.

Where polystyrene is used as a binder, it is desirable to control the binder content depending on the average molecular weight of the binder as follows:

| Average molecular weight | Binder content |
| --- | --- |
| 1,000 to 200,000 | 30 to 90% by weight. |
| 200,000 to 600,000 | 30 to 80% by weight. |
| 600,000 to 1,000,000 | 30 to 70% by weight. |

The acrylate monomers constituting the styrene-acrylate copolymer include, for example, n-butyl methacrylate, isobutyl methacrylate, ethyl acrylate, n-butyl acrylate, methyl methacrylate, glycidyl methacrylate, dimethylaminoethyl methacrylate, diethylaminoethyl methacrylate, diethylaminopropyl acrylate, 2-ethylhexyl acrylate, butylacrylate-N-(ethoxymethyl) acrylamide, ethyleneglycol methacrylate, and 4-hexafluorobutyl methacrylate. These acrylate monomers can be used singly or in the form of a mixture of at least monomers. It is also possible to use, for example, butadiene, maleic ester, chloroprene, etc., in addition to styrene and acrylate monomer for the polymerization. In this case, it is desirable to set the amount of the additive component such as butadiene at 10% by weight or less. It is also desirable for the binder polymer to contain the styrene in an amount of 50% by weight or more. Where styrene-acrylate copolymer is used as a binder, it is desirable to control the binder content of the image forming material depending on the average molecular weight of the binder polymer as follows:

| Average molecular weight | Binder content |
| --- | --- |
| 1,000 to 200,000 | 30 to 95% by weight. |
| 200,000 to 600,000 | 30 to 85% by weight. |
| 600,000 to 1,000,000 | 30 to 75% by weight. |

A blend polymer consisting of polystyrene and acrylic resin can also be used as a binder. In this case, it is possible for the blend polymer to contain a single or a plurality of acrylic resins. It is also possible to use a copolymer containing at most 10% by weight of butadiene, maleic ester, chloroprene, etc. The polystyrene content of the binder is desirably 50% by weight or more. Where a blend polymer consisting of polystyrene and acrylic resin is used as a binder, it is desirable to control the binder content of the image forming material depending on the average molecular weight of the polymer as follows:

| Average molecular weight | Binder content |
| --- | --- |
| 1,000 to 200,000 | 30 to 95% by weight. |
| 200,000 to 600,000 | 30 to 85% by weight. |
| 400,000 to 1,000,000 | 30 to 75% by weight. |

The carboxylic acids and the polyhydric alcohols used as starting materials of the polyester are not particularly limited. For example, the carboxylic acids include terephthalic acid, fumaric acid, maleic acid, succinic acid, glutaric acid, adipic acid, pimelic acid, suberic acid, azelaic acid, sebacic acid, brasylic acid, pyromellitic acid, citraconic acid, glutaconic acid, mesaconic acid, itaconic acid, teraconic acid, phthalic acid, isophthalic acid, hemimellitic acid, mellophanic acid, trimesic acid, prehnitic acid, and trimellitic acid. These carboxylic acids can be used singly or in the form of a mixture of at least two of these compounds. The polyhydric alcohols used in the present invention include, for example, bisphenol A, hydrogenated bisphenol A, ethylene glycol, propylene glycol, butanediol, neopentyldiol, hexamethylenediol, heptanediol, octanediol, pentaglycerol, pentaerythritol, cyclohexanediol, cyclopentanediol, pinacol, glycerin, etherified diphenol, catechol, resorcinol, pyrogallol, benzenetriol, phloroglucinol, and benzenetetraol. These polyhydric alcohols can be used singly or in the form of a mixture of at least two compounds. It is also possible to use a blend polymer consisting of at least two polyesters. Where the polyester is used as a binder of a toner, it is desirable to control the binder content of the image forming material in accordance with the average molecular weight of the polyester as follows:

| Average molecular weight | Binder content |
| --- | --- |
| 1,000 to 5,000 | 30 to 90% by weight. |
| 5,000 to 10,000 | 30 to 90% by weight. |
| 10,000 to 20,000 | 30 to 87% by weight. |
| 20,000 to 100,000 | 30 to 85% by weight. |
| 100,000 to 1,000,000 | 30 to 80% by weight. |

Where polyester is used as a binder of a thermal transfer ink, paraffin is used as a wax component. Therefore, it is desirable for the polyester content to fall within a range of between 2 to 50% by weight.

Epoxy resin is synthesized by using as raw materials epichlorohydrin and a compound having a polyhydric phenolic hydroxyl group. The polyhydric phenolic compounds used in the present invention include, for example, bisphenol A, hydrogenated bisphenol A, bisphenol S, etherified diphenyl, catechol, resorcin, pyrogallol, benzenetriol, phloroglucinol, and benzenetetraol. These compounds can be used singly or in the form of a mixture of at least two compounds. Also, it is possible to add 15% by weight or less of phenolic resin, urea resin, melamine resin, alkyd resin, acrylic resin, polyester, polyamide or polyurethane to the epoxy resin. Where an epoxy resin is used as a binder of a toner, it is desirable to control the resin content in accordance with the average molecular weight of the resin as follows:

| Average molecular weight | Binder content |
| --- | --- |
| 1,000 to 5,000 | 30 to 95% by weight. |
| 5,000 to 10,000 | 30 to 90% by weight. |
| 10,000 to 20,000 | 30 to 87% by weight. |
| 20,000 to 100,000 | 30 to 85% by weight. |
| 100,000 to 1,000,000 | 30 to 80% by weight. |

Where the epoxy resin is used as a binder of a thermal transfer ink, paraffin is used as a wax component. Therefore, it is desirable for the polyester content to fall within a range of between 2 and 50% by weight.

Where polyester or epoxy resin is used as a binder, the unreacted carboxylic acid or phenol remaining within the binder possibly causes the image not to be decolored satisfactorily or possibly impairs the stability of the decolored state.

A basic compound is used in the present invention in order to avoid having the decoloration of the image adversely affected by the unreacted carboxylic acid or phenol. In the case of using a basic compound, it is possible to avoid having the decoloration of the image affected, even if the image is formed on a paper sheet having a pH value smaller than 8. The basic compound used in the present invention is not particularly limited. Both inorganic and organic basic compound can be used in the present invention.

Suitable inorganic basic compounds used in the present invention include, for example, calcium chloride, potassium hydroxide, calcium hydroxide, sodium hydroxide, barium hydroxide, magnesium hydroxide, ammonium carbonate, potassium carbonate, calcium carbonate, sodium carbonate, magnesium carbonate, ammonium hydrogencarbonate, potassium hydrogencarbonate, sodium hydrogencarbonate, alkaline metal borates, tripotassium phosphate, dipotassium hydrogenphosphate, calcium phosphate, trisodium phosphate, and disodium hydrogenphosphate.

Suitable organic compounds used in the present invention include, for example, primary to tertiary amines and quaternary ammonium salt. The counter ions of the quaternary ammonium salt include, for example, hydroxyl ion, halogen ion and alkoxide ion.

The non-aromatic organic basic compounds used in the present invention include, for example, compounds having aliphatic hydrocarbon group having 1 to 50 carbon atoms or having alicyclic hydrocarbon group having 1 to 50 carbon atoms. It is possible for these hydrocarbon groups to be substituted by at least one substituent selected from the group consisting of vinyl group, ethynylene group, ethynyl group, oxy group, oxycarbonyl group, thiocarbonyl group, dithiocarbonyl group, thio group, sulfinyl group, sulfonyl group, carbonyl group, hydrazo group, azo group, azido group, nitrilo group, diazoamino group, imino group, urea bond, thiourea bond, amide bond, urethane bond, and carbonyldioxy group.

The aromatic organic basic compounds used in the present invention include, for example, those having an aromatic ring such as benzene ring, biphenyl ring, naphthalene ring, tetralone ring, phenanthrene ring, indene ring, indan ring, pentalene ring, azulene ring, heptalene ring and fluorene ring. It is possible for an aliphatic hydrocarbon group having 1 to 50 carbon atoms or an alicyclic hydrocarbon group having 1 to 50 carbon atoms to be substituted in these aromatic rings. Further, it is possible for the substituents given above to be substituted in these hydrocarbon groups.

The cyclic amines used in the present invention include, for example, aziridine, azetidine, pyrroline, pyrrolidine, indoline, pyridine, piperidine, hydropyridine, quinoline, isoquinoline, tetrahydroquinoline, tetrahydroisoquinoline, acridine, phenanthridine, phenanthroline, pyrazole, benzimidazole, pyridazine, pyrimidine, pyrazine, imidazole, histamine, decahydroquinoline, pyrazoline, imidazoline, piperazine, cinnoline, phtharazine, quinazoline, quinoxaline, dihydrophenazine, triazole, benzotriazole, triazine, tetrazole, pentamethylenetetrazole, tetrazine, purine, pteridine, carboline, naphthyridine, indolizine, quinolizine, quinuclidine, oxazole, benzoxazole, isoxazole, anthranil, oxazine, oxazoline, thiazole, thiazolidine, benzothiazole, benzothiazoline, isothiazole, thiazine, azoxim, furazan, oxadiazole, thiadiazole, benzothidiazole, thiadiazine, dithiazine, morpholine, hexamethylenetetramine, and diazabicycloundecene.

The additional organic basic compounds used in the present invention include, for example, guanidine, aminoguanidine, urea, thio urea, semicarbazide, and carbonohydrazide.

In the present invention, the basic compounds can be mixed as they are with the other components of the image forming material. Also, it is desirable to mix the basic compounds, which are sealed in microcapsules, with the other components of the image forming material.

For a shell material of maicrocapsules, selected is a material which can be broken when the image forming material is heated to be decolored and can release the basic compounds sealed in the microcapusules. The temperature where the maicrocapsules are broken should preferably be 120 to 200° C. Examples of suitable shell material are polyether sulfone, polyether ketone, epoxy resin, polyethylene, polypropylene, polyphenylene ether, polyphenylene sulfite, polyalkylene oxide, polystyrene, polyphenol ether, nylon, polyamide, polyurethane, gelatin, polymethacrylic acid, polyimide, melamine resin, polyester, polyacrylic acid, polysiloxane, polysulfide, gum arabic, polyvinyl pyrrolidone, polycarbonate, polysulfone, polyisocyanate and polypyrrole. These compounds can be used singly or in combination of two or more species. Also, a copolymer of these compounds may be used.

Next, an apparatus used for decoloring the decolorizable ink of the present invention and an ink-jet printer using the decolorizable ink are described below.

An apparatus used for decoloring the decolorizable ink of the present invention to recycle paper sheets by heat process may be in any form, as long as the apparatus has a mechanism capable of heating and rapid cooling a paper sheet. A specific example of such an apparatus is a thermal head having a heating resistor. A thermal bar, which is one kind of thermal head, having a heating resistor capable of heating the paper sheet across a large area can be used. In this case, a heating area on a paper sheet may be adjusted by controlling current in the thermal bar so as to decolor only a desired area of the paper sheet. If a heating apparatus such as a heat roller is used, a large quantity of printed paper can be decolored for recycling. In the case where printing on the surface of an article not having sheet-like form is to be decolored, the surface of the article is heated with an infrared lamp or by hot air and then rapidly cooled by cold air or with a heat sink having a large heat capacity.

For example, as shown in FIG. 1, a thermal bar 13 whose heating area is adjusted to a proper area is located between a pair of feed rollers 11, 11 and a pair of transport rollers 12, 12, and a paper sheet 10 already printed with the decolorizable ink of the present invention is passed through the thermal bar 13. When electric current is made to flow through the thermal bar 13, heating up to 300° C. can be effected instantly. The paper sheet 10 is heated with the thermal bar 13, and then comes out of the apparatus to be cooled rapidly, so that the print on the paper sheet can be decolored. FIG. 2 shows a decoloring apparatus (recycling apparatus) 21 of a hand-feed type which incorporates the decoloring mechanism of FIG. 1.

FIG. 3 shows a mechanism with which decoloring of print on a paper sheet and recycling of the paper sheet can be carried out in a more reliable manner than that in the mechanism of FIG. 1. As shown in FIG. 3, in addition to the mechanism of FIG. 1, a pair of pressing rollers 14, 14 is disposed to smooth wrinkles on the paper sheet, and also a UV source 15 and a humidifier 16 are disposed between the transport rollers 12, 12 and the pressing rollers 14, 14. In this mechanism, the coloring matter is decomposed completely to be colorless on exposure by radiation from the UV source 15, the wrinkles on the paper sheet 10 can effectively be smoothed by the pressing rollers 14, 14 after proper humidity is given by the humidifier 16. When such a mechanism is used, the number of repeating use of the same paper sheet can be increased. Degradation of the paper sheet does not become a problem, if a high-grade paper sheet such as plastic-coated paper is used for a special purpose.

A printer using the decolorizable ink of the present invention is most preferably an ink-jet printer. When ink containing a reversible decolorizer is used, it is especially preferable to use an ink-jet printer that injects ink without any heating. Accordingly, the most preferable means for injecting the ink is one that uses vibration of a piezoelectric element or supersonic waves. If ink containing a decolorizer of the (b) group and the (c) group or ink containing components having high Tg is used, a bubble-jet printer in which ink is heated may be used.

Figure 4B:
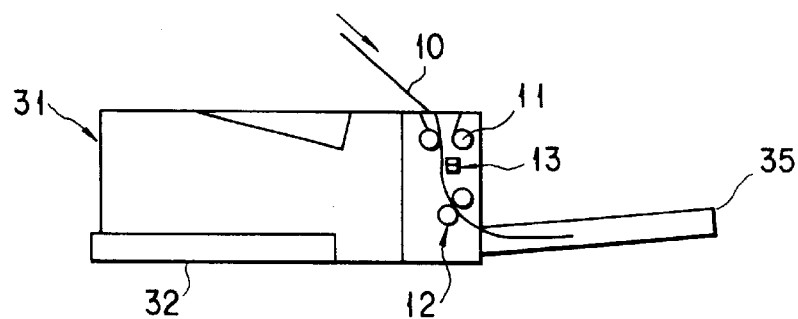
FIG. 4B is a schematic view of a decoloring mechanism used in the printer.

FIGS. 4A and 4B show an ink-jet printer having the decoloring mechanism of FIG. 1. In this printer 31, paper sheets to be printed are stored in the feed tray 32. A paper sheet is printed by way of a printing mechanism similar to that of a common ink-jet printer and finally comes out from the outlet 33. Upon recycling, a printed paper sheet 10 is inserted through the inlet 34, the paper sheet 10 travels through the decoloring mechanism equipped with the feed rollers 11, transport rollers 12 and the thermal bar 13 as shown in FIG. 1, and finally the paper sheet 10 is received into the recovery tray 35. In this case, the printing tray 32 and the recovery tray 35 are in the same shape so as to be exchangeable.

Figure 5:
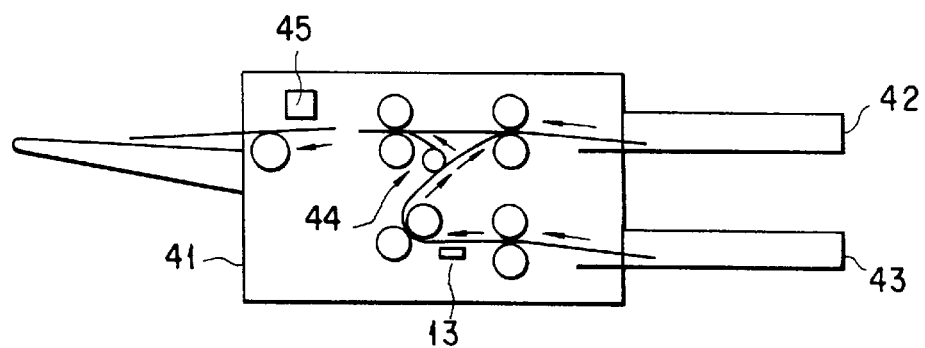
FIG. 5 is a schematic view of another ink-jet printer of the present invention.

FIG. 5 shows an ink-jet printer capable of printing on both new paper sheets and printed paper sheets. In this printer 41, trays 42, 43 for respectively accommodating new and printed paper sheets are mounted on a side of the printer 41. The tray 42 is also used as a tray for recovering recycled paper after the printed information on the printed paper is decolored. A new paper sheet is fed from the tray 42, printed with a printer head 45 while passing through a printing mechanism of a common ink-jet printer, and then discharged. On the other hand, a printed paper sheet is fed from the tray 43, decolored with the thermal bar 13, and then recovered in the tray 42 or fed again toward the printer head 45 so as to be printed and then discharged. Switching between both transport courses is conducted by a switching mechanism 44.

Figure 6:
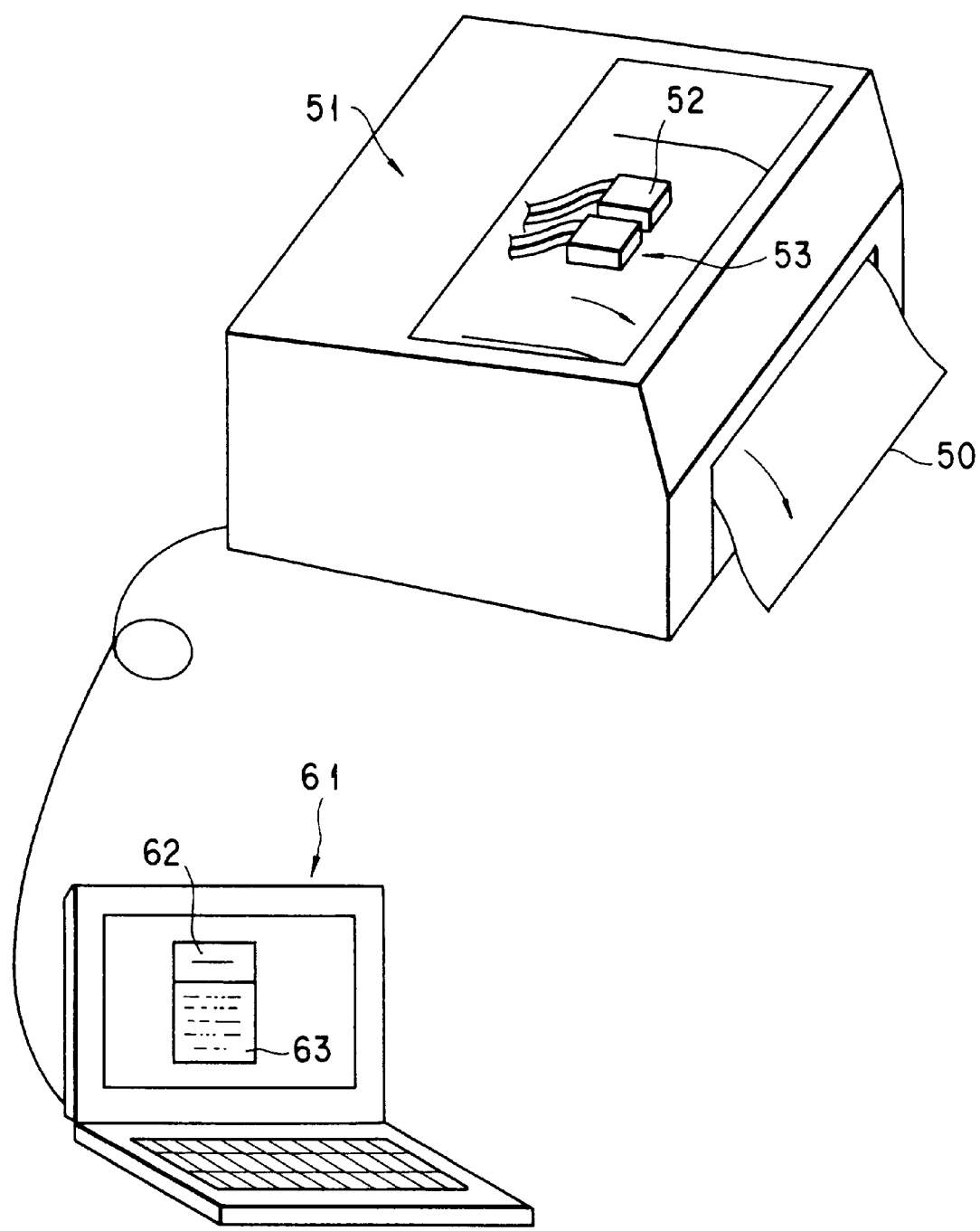
FIG. 6 is a perspective view of still another ink-jet printer of the present invention.

FIG. 6 shows an ink-jet printer having a head for printing with the decolorizable ink of the present invention and another head for printing with a normal ink. In this printer 51, the head 52 for printing with the decolorizable ink and the head 53 for printing with the normal ink are equipped. Printing information is instructed to the printer 51 from an application software executed on the computer 61. An image of a paper sheet to be printed is displayed on the computer display. Input to a fixed information region 62 and a variable information region 63 is conducted on the display. In the printer 51, both heads 52 and 53 for the decolorizable ink and the normal ink are actuated according to the instructions from the application software, thereby carrying out printing on a paper sheet 50 as instructed. With this type of printer, only variable information possibly be rewritten can be repeatedly decolored and printed again many times.

Figure 7:
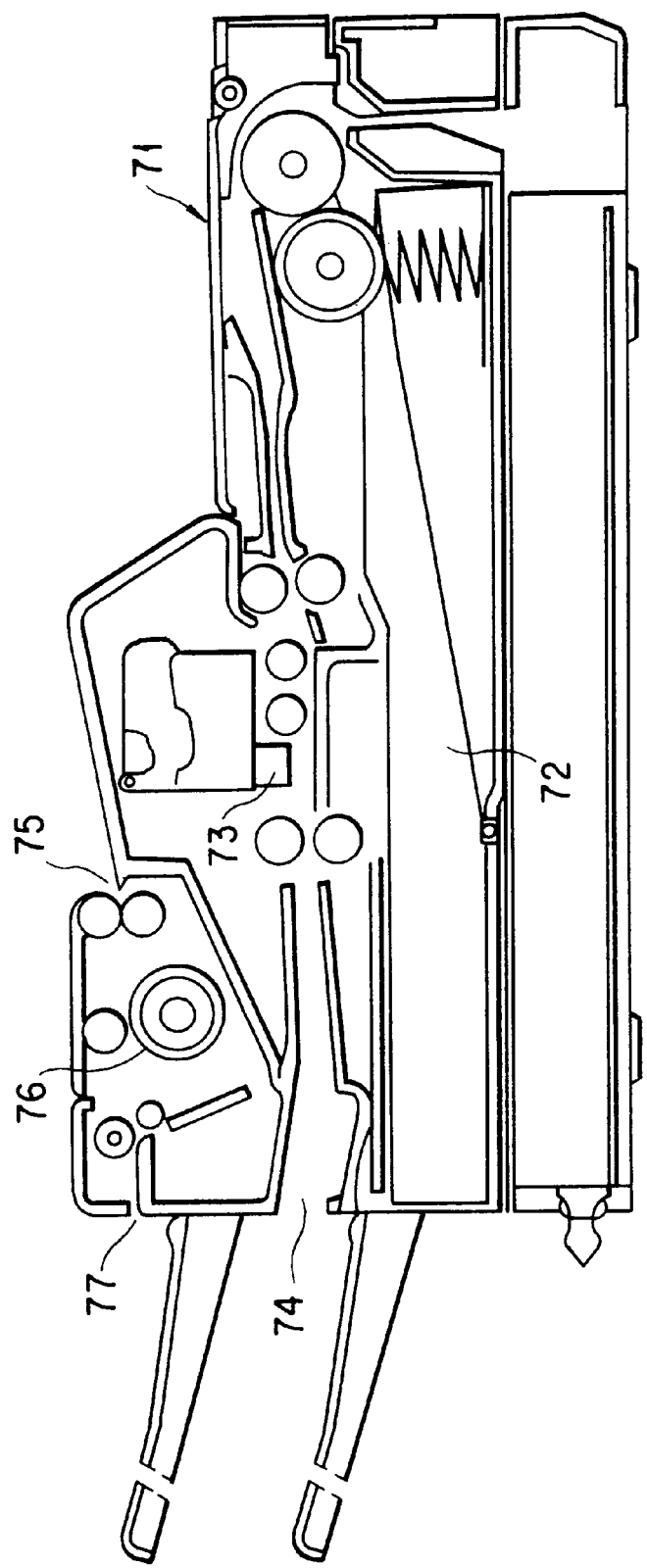
FIG. 7 is a view illustrating a structure of still another ink-jet printer.

FIG. 7 shows an ink-jet printer having a decoloring mechanism consisting of a heat roller. In this printer 71, paper sheets placed in the cassette 72 in the bottom are fed by a transport roller, printed by the printer head 73 and discharged through the outlet 74. When a printed paper is recycled, the printed paper sheet is fed through the inlet 75, decolored by heating with the heat roller 76, and then discharged through another outlet 77.

In the present invention, toner for electrophotographic prepared by pulverizing a composition containing a color former, a developer, a decolorizer and a binder may be used to decolor a printed paper sheet. In the electrophotographic application, toner transferred on the paper sheet is fixed by heating, and therefore it is preferable to use a compatible or phase-separation inhibiting decolorizer.

Figure 8:
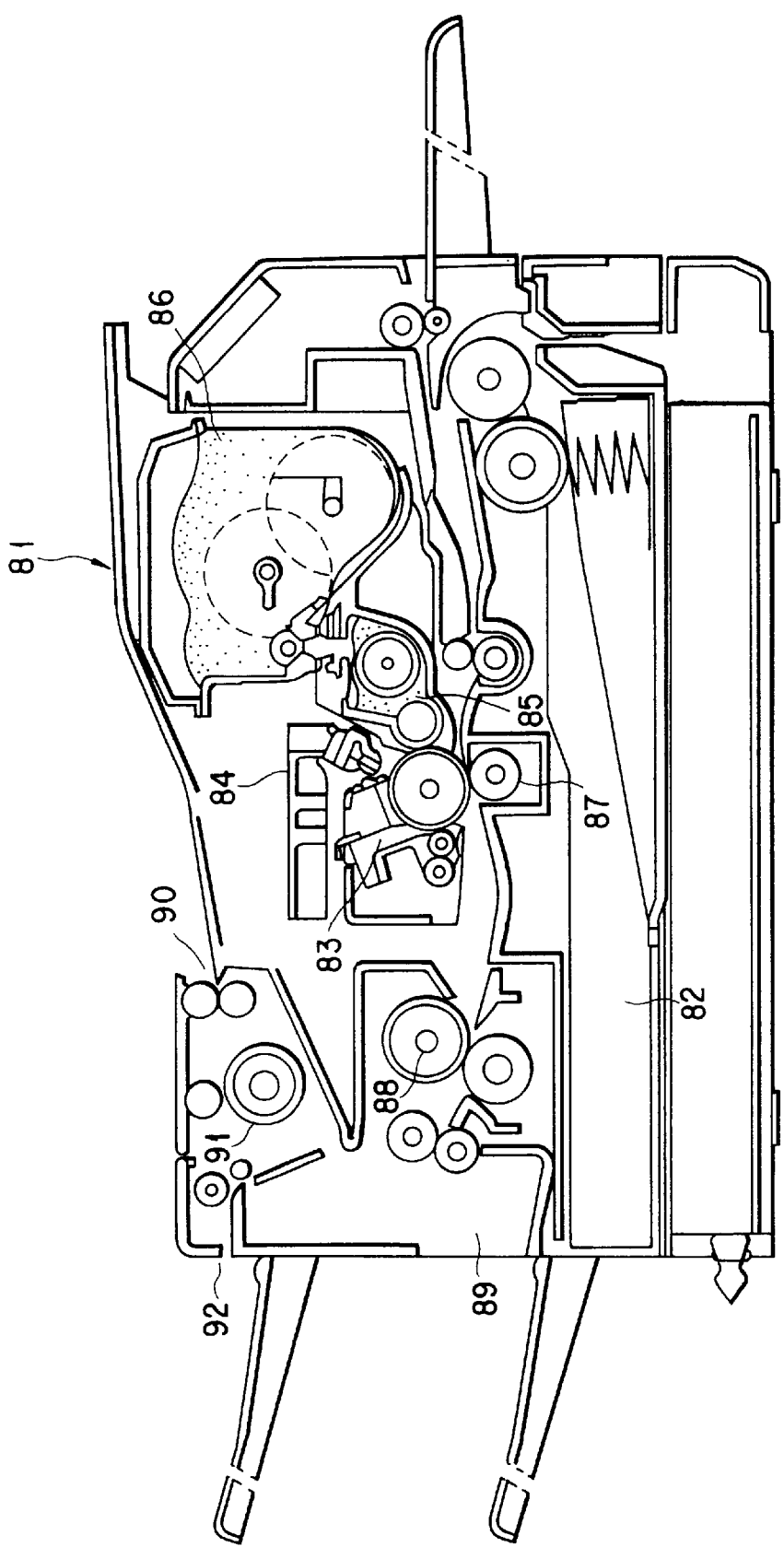
FIG. 8 is a view illustrating a structure of a copy machine of electrophotographic type of the present invention.

FIG. 8 shows a copy machine of electrophotographic type having a decoloring mechanism consisting of a heat roller. In this copy machine 81, paper sheet are accommodated in the cassette 82 in the bottom. The photosensitive drum 83 locating in the central portion of the machine is irradiated with light from the LED head 84, thereby forming a latent image on the surface of the drum 83. To the drum 83, charged toner 86 is attached with the developing apparatus 85 by an electrostatic force to form a toner image. A paper sheet is, in a timely manner with the development, transported between the drum 83 and the transfer roller 87, thereby transferring the toner to the paper sheet. The toner transferred on the paper sheet is fixed by the fixing roller 88 and then discharged through the outlet 89. When a printed paper sheet is recycled, the paper sheet is fed through the inlet 90, heated by a heat roller 91 to decolor and then discharged through the outlet 92. Temperatures of the fixing roller 88 and the heat roller 91 are so set, for example, 140° C. and 190° C., that the temperature of the heat roller 91 is higher than that of the fixing roller 88.

In the copy machine of electrophotographic type, printing toner comprising a color former and a developer and decoloring toner comprising a decolorizer may be used.

Components of the ink of the present invention can be applicable to a thermal printer. In this case, a sheet (or ribbon) for printing and a sheet (or ribbon) for decoloring are preferably used to effect printing and decoloring. The sheet or ribbon is made of a heat-resistant resin such as polyethylene terephthalate (PET).

For example, an ink composition comprising a color former and a developer is applied on a sheet substrate to prepare a printing sheet. The ink composition may be applied together with wax in order to facilitate transfer to the paper. Another composition including a decolorizer is applied on another sheet substrate to prepare a decoloring sheet. Using a thermal printer, the ink composition on the printing sheet is thermally transferred to a paper sheet to effect printing and, when necessary, the composition including the decolorizer on the decoloring sheet is thermally transferred to the printed paper sheet to effect decoloring. As to the decolorizer, those categorized in the compatible decolorizer or the phase-separation inhibiting decolorizer are preferred. In the decoloring operation, a power of the thermal printer head is raised so as to operate at a higher temperature as compared with that in the printing operation.

FIG. 9A shows an example of a printing sheet, and FIG. 9B shows an example of a decoloring sheet. The printing sheet 100 in FIG. 9A has a structure that the release layer 103, the ink layer 104 and the lubricant layer 105 are formed on the PET sheet 101 on the back of which the back coating layer 102 is formed. Note that, the release layer 103 and the lubricant layer 105 are not necessarily required. The decoloring sheet 200 in FIG. 9B has a structure that the release layer 203, the barrier layer 204 and the decolorizer layer 205 are formed on the PET sheet 201 on the back of which the back coating layer 202 is formed. With the barrier layer 204 inserted, the decolorizer can be prevented from spreading wide over a medium. Note that, the release layer 203 and the barrier layer 204 are not necessarily required.

In the above case, it may be used an ink composition in colored state which comprises a color former, a developer and a decolorizer having a relatively low glass transition point. When the ink composition is thermally transferred to a paper sheet and the printed paper sheet is temporarily decolored by heating and then the paper sheet is left at room temperature, the decolored printing can be restored to be visible. Such a function is applicable, for example, to judgment of storage conditions of fresh foods to be refrigerated. That is, if a label on which warning is printed with the above ink composition is attached on the package of fresh foods and then the label is decolored, the warning appears on the label when the package is left at room temperature.

In addition, when it is desired that an ink composition has a reversibility, a phase-separation accelerator, which is a compound that accelerates phase separation of a color former and a developer from a decolorizer, may be added in order to raise a coloring speed. Preferred phase-separation accelerator is a low molecular weight organic compound, which is highly crystallizable, having a long chain alkyl group with eight or more carbon atoms and a polar group such as OH, CO and COOH. Examples of phase-separation accelerator are linear higher monohydric alcohols, linear higher polyhydric alcohols, linear higher fatty acids, linear higher polyvalent fatty acids, esters and ethers thereof, linear higher fatty acid amides and linear higher polyvalent fatty acid amides.

To be more specific, the phase-separation accelerator includes: linear higher monohydric alcohols such as 1-docosanol, 1-tetracosanol, 1-hexacosanol and 1-octacosanol; linear higher polyhydric alcohols such as 1,12-dodecanediol, 1,12-octadecanediol, 1,2-tetradecanediol and 1,2-hexadecanediol; linear higher fatty acids such as behenic acid, 1-docosanic acid, 1-tetracosanic acid, 1-hexacosanic acid and 1-octacosanic acid; linear higher polyhydric fatty acids such as dodecanedioic acid and 1,12-dodecanedicarboxylic acid; linear higher ketons such as stearone; linear higher fatty acid alcohol amides such as isopropanolamide stearate, isopropanolamide behenate and hexanolamide behenate; and linear higher fatty acid dioldiesters such as ethyleneglycol dilaurate, catechol dilaurate and cyclohexanediol dilaurate. These compounds can be used singly or in combination of two or more species. Examples of a mixture which can be used as the phase-separation accelerator are ester-base waxes, alcohol-base waxes and urethane-base waxes.

Combinations of components applied on a printing sheet and a decoloring sheet are modified from the above mentioned combinations. For example, a printing sheet applied with an ink composition comprising a color former, a developer and a phase-separation inhibiting decolorizer (or a compatible decolorizer) and a decoloring sheet applied with a composition including a reversible decolorizer may be used. Further, only a printing sheet applied with an ink composition comprising a color former, a developer, a reversible decolorizer and a phase-separation inhibiting decolorizer (or compatible decolorizer) in a state where the reversible decolorizer and the phase-separation inhibiting decolorizer (or compatible decolorizer) are phase-separated may be used.

In the present invention, two kinds of printing method may be used together. For example, a paper sheet is printed with toner including a color former and a developer in electrophotography and then a decolorizer may be thermally transferred from a decoloring sheet to the printed paper sheet for decoloring.

Further, printing and decoloring may be carried out in the following manner. Upon printing, first toner including a color former and a developer is transferred on a heat-resistant sheet in electrophotography, and then the first toner on the heat-resistant sheet is thermally transferred to a paper sheet. Upon decoloring, second toner including a decolorizer is transferred on a heat-resistant sheet in electrophotography, and then the second toner on the heat-resistant sheet is thermally transferred to the printed paper sheet. In this case, too, decoloring is carried out at a higher temperature than printing. In this method, partial correction can be made in a printed region. In normal electrophotography, since a paper sheet is entirely heated in the fixing process, if a part of printed paper sheet is decolored and subsequently re-printed and then a different part of the re-printed paper is decolored, the re-printed part is likely to be decolored in the fixing process. On the contrary, in the above method, correction can be repeated two or more times, since there is no need for the fixing process.

It is desirable for the solvent used in the method in which an image forming material is brought into contact with the solvent to satisfy requirements A and B given below:

A. The solvent should desirably be effective for assisting the formation of hydrogen bond between the developer and the decolorizer.

B. The solvent should desirably exhibit a high affinity with the binder so as to permeate deep inside the image forming material.

The solvent satisfying requirement A given above can be used singly. Also, it is possible to use a plurality of solvents in combination to allow the mixed solvents to satisfy requirements A and B.

The solvents satisfying both requirements A and B include, for example, ethers, ketones and esters. To be more specific, the solvents satisfying requirements A and B include, for example, saturated ethers such as ethyl ether, ethyl propyl ether, ethyl isopropyl ether, isopentyl methyl ether, butyl ethyl ether, dipropyl ether, diisopropyl ether, ethyl isopropyl ether, dibutyl ether, dipentyl ether, diisopentyl ether, and dihexyl ether; unsaturated ethers such as ethyl vinyl ether, aryl ethyl ether, diaryl ether, and ethyl propargyl ether; ethers of dihydric alcohols such as ethyleneglycol monomethyl ether, ethyleneglycol monoethyl ether, ethyleneglycol monobutyl ether, ethyleneglycol dimethyl ether, and ethyleneglycol diethyl ether; cyclic ethers such as oxetane, tetrahydrofuran, tetrahydropyran, dioxolane, dioxane, and trioxane; saturated ketones such as acetone, methyl ethyl ketone, methyl propyl ketone, isopropyl methyl ketone, butyl methyl ketone, ethyl propyl ketone, isobutyl methyl ketone, pinacolone, methyl pentyl ketone, butyl ethyl ketone, dipropyl ketone, diisopropyl ketone, hexyl methyl ketone, isohexyl methyl ketone, heptyl methyl ketone, and dibutyl ketone; unsaturated ketones such as ethylidene acetone, allyl acetone, and mesityl oxide; cyclic kotones such as cyclopentanone, cyclohexanone, and cyclooctanone; and esters such as ethyl formate, propyl formate, butyl formate, isobutyl formate, pentyl formate, isopentyl formate, ethyl acetate, isopropyl acetate, propyl acetate, butyl acetate, isobutyl acetate, pentyl acetate, isopentyl acetate, sec-amyl acetate, hexyl acetate, allyl acetate, 2-methoxyethyl acetate, 2-ethoxyethyl acetate, 1,2-diacetoxy ethane, methyl propionate, ethyl propionate, propyl propionate, isopropyl propionate, butyl propionate, pentyl propionate, isopentyl propionate, sec-amyl propionate, 2-methoxypropyl acetate, 2-ethoxypropyl acetate, methyl butyrate, ethyl butyrate, propyl butyrate, isopropyl butyrate, butyl butyrate, pentyl butyrate, isopentyl butyrate, sec-amyl butyrate, methyl isobutyrate, ethyl isobutyrate, propyl isobutyrate, isopropyl isobutyrate, butyl isobutyrate, pentyl isobutyrate, isopentyl isobutyrate, sec-amyl isobutyrate, methyl valerate, ethyl valerate, propyl valerate, isopropyl valerate, butyl valerate, methyl hexanoate, ethyl hexanoate, propyl hexanoate, isopropyl hexanoate and ethyl ladate. Additional solvents used in the present invention include, for example, methylene chloride, γ-butyrolactone, β-propyolactone, N-methylpyrrolidinone, dimethyl formamide, dimethyl acetoamide and dimethyl sulfoxide. These solvents can be used singly or in the form of a mixture of at least two compounds. In the case of using mixed solvents, the mixing ratio can be determined arbitrarily (the first group).

The solvents satisfying requirement A, though the affinity with the binder is low, include, for example, water, methyl alcohol, ethyl alcohol, propyl alcohol, isopropyl alcohol, butyl alcohol, isobutyl alcohol, pentyl alcohol, 2-pentyl alcohol, 3-pentyl alcohol, isopentyl alcohol, 1-hexanol, 2-hexanol, 3-hexanol, cyclopentanol, cyclohexanol, ethylene glycol, propylene glycol, butylene glycol, and glycerin (the second group).

On the other hand, the solvents having a high affinity with the binder but failing to satisfy requirement A include, for example, toluene, ethylbenzene, propylbenzene, cumene, butylbenzene, isobutylbenzene, sec-butylbenzene, pentylbenzene, diethylbenzene, mesitylene, xylene, cresol, dimethoxybenzene, dimethoxytoluene, benzyl alcohol, tolyl carbinol, cumyl alcohol, acetophenone, propiophenone, hexane, pentane, heptane, octane, cyclohexane, cyclopentane, cycloheptane, cyclooctane, and petroleum fractions such as petroleum ether and benzene (the third group).

The first group of the solvents given above can be used singly satisfactorily. The second group of the solvents, which can certainly be used singly, should desirably be mixed with the first group of the solvents. Since each of these first and second groups of the solvents exhibits a decoloring capability, these solvents can be mixed at an arbitrary mixing ratio. Where a solvent of the second group is mixed with a solvent of the third group, the mixing ratio is not particularly limited as far as the mixed solvents exhibit a sufficient decoloring capability. However, it is desirable for the mixing amount of the third group solvent to fall within a range of between 20 and 80% by weight. It is also possible to use the third group solvent together with the first group solvent. In this case, the mixing amount of the third group solvent should be 90% by weight or less. Further, it is possible to use the first, second and third group solvents together. In this case, it is desirable for the mixing amount of the third group solvent to be 80% by weight or less.

For efficiently decoloring the image forming material, it is desirable to heat in advance the solvent. In this case, the solvent temperature should desirably fall within a range of between 40° C. and 150° C.

In the case of employing a decoloring method using a solvent, a decolorizer may be added to the solvent. For example, the image can be formed and decolored by the methods exemplified below:

1. An image is formed by using an image forming material containing a color former, a developer and a highly amorphous phase separation inhibitor, and the image forming material in a color developed state is brought into contact with a solvent containing a slightly amorphous phase separation inhibitor so as to achieve decoloration.

2. An image is formed by using an image forming material containing a color former, a developer and a slightly amorphous phase separation inhibitor, and the image forming material in a color developed state is brought into contact with a solvent containing a highly amorphous phase separation inhibitor so as to achieve decoloration.

3. An image is formed by using an image forming material containing a color former and a developer, and the image forming material in a color developed state is brought into contact with a solvent containing a highly amorphous phase separation inhibitor and a slightly amorphous phase separation inhibitor so as to achieve decoloration.

In the methods exemplified above, it is desirable to use at least one decolorizer selected from the group consisting of a biodegradable sterol compound extracted from an animal, plant or fungi, cyclic sugar alcohols or derivatives thereof, said decolorizer being mixed with the solvent for decoloring the image. A plurality of these decolorizers can be used together in the form of a mixture.

In the present invention, an image may be formed by using an image forming material containing a color former, a developer, a decolorizer and a binder consisting of a polyester or an epoxy resin. In decoloring the image, a solvent containing a basic compound can be brought into contact with the image forming material. In bringing the solvent containing a basic compound into contact with the image forming material, the solvent may be sprayed onto a paper sheet bearing the image. Alternatively, the paper sheet may be immersed in a solution. Further, after contact with the solvent containing a basic compound, the image forming material may be heated.

The solvent used for preparing a solution of a basic compound is not particularly limited as far as the basic compound can be dissolved in the solvent. The solvents used for this purpose include, for example, water, methyl alcohol, ethyl alcohol, isopropyl alcohol, acetone, methylene chloride, ethyl acetate, ethyl lactate, ethyl butyrate, n-pentyl butyrate, ethyl ether, tetrahydrofuran, ethyleneglycol dimethyl ether, ethyleneglycol diethyl ether, cellosolve acetate, γ-butyrolactone, β-butyrolactone, N-methyl pyrrolidinone, dimethyl formamide, dimethyl acetamide, dimethyl sulfoxide, methyl ethyl ketone, methyl isopropyl ketone, toluene, xylene, hexane, pentane, heptane, petroleum fractions such as petroleum ether and benzine. It is desirable for the basic compound solution to have a concentration of 1 to 40% by weight.

For bringing the image forming material which has developed color on a paper sheet into contact with a solvent, it is possible to use a roller for immersing the paper sheet in a solvent housed in a container, a spray nozzle for spraying the solvent onto the paper sheet, a nozzle for dripping the solvent onto the paper sheet, and a gravure roller for supplying the solvent onto the paper sheet. On the other hand, the solvent can be removed from the paper sheet by using, for example, a hot air, an infrared ray lamp, a heat roller, a hot press, a thermal printer head (TPH) and a thermal bar. Where the solvent used is likely to be evaporated, the paper sheet may be subjected to a natural drying. Further, it is desirable to use a solvent recovery means used in the apparatus of the present invention.

EXAMPLES

Examples of the present invention will be described below.

Example 1

One part by weight of Crystal Violet lactone (CVL) as a color former, two parts by weight of 2,4,4'- trihydroxybenzophenone as a developer and 10 parts by weight of methylandrostenediol as a decolorizer were homogeneously mixed in a mixture solvent of toluene and cyclohexane, and then the solvent was evaporated off to obtain powder. After the powder was heated up to 150° C., it was cooled down to room temperature in 10 minutes to develop blue color. One gram of the powder was put into 50 cc of water added with 0.5 grams of sodium stearate as surfactant, and the ink composition powder was pulverized to a particle size of a micron order in a pulverizer to prepare ink with dispersed fine powder therein.

Using the ink thus prepared, characters were written on a paper sheet of A4 size with pen. After drying, a thermal bar set at 200° C. was passed above the paper sheet in two seconds. As a result, the characters completely disappeared and a blank paper sheet was obtained. When writing and decoloring were repeated 30 times, also a blank paper sheet was finally obtained. The optical density (OD) of the blank paper sheet finally obtained was 0.15.

Example 2

One part by weight of ETAC as a color former, one part by weight of 2,4,4'-trihydroxybenzophenone as a developer, five parts by weight of heckogenin as a decolorizer were homogeneously mixed in a mixture solvent of toluene and cyclohexane, and then the solvent was evaporated off to obtain powder. After the powder was heated up to 150° C., it was cooled down to room temperature in 10 minutes to develop black color. One gram of the powder was put into 50 cc of water added with 0.5 grams of sodium stearate as surfactant, and the ink composition powder was pulverized to a particle size of a micron order in a pulverizer to prepare ink with dispersed fine powder therein.

The ink was used in an ink-jet printer equipped with a piezoelectric element (MJ800C manufactured by Epson Co.), and printing was carried out on a paper sheet of A4 size. After the printing, a thermal bar was passed above the paper sheet to decolor the printed information. When the recycled paper was stored at 60° C. for 30 hours, the printed information did not appear again, which revealed that the recycled paper sheet had a good storage stability. After the paper sheet was printed again, the printed surface was irradiated with light at 5000 lux for 300 hours. In this case, decrease in printing density was not higher than 10%.

Example 3

One part by weight of PSD-HR (available from Nippon Soda Co. Ltd.) as a color former, one part by weight of α,α,α'-tris(4-hydroxyphenyl)-1-ethyl-4-isoproylbenzene as a developer and 20 parts by weight of pregnenolone as a decolorizer were melted to form a mixture, and then the mixture was gradually cooled to obtain a red solid product. The product dissolved in an aqueous solution containing 8 wt % of gum arabic was pulverized with a ball mill to a particle size of the order of 10 µm so that the powder was dispersed in the aqueous solution. The dispersed product was mixed with an aqueous solution of gelatin at 40° C., the mixture was stirred for 1 hours, and then water was added dropwise while stirring to dilute the mixture. Next, an aqueous solution containing 10 wt % of acetic acid was added to adjust pH of the mixture to be 3.9, and then 37% formalin was added to adjust pH of the mixture to be 7.0. The liquid thus prepared was cooled to 5° C., left at room temperature for 3 days, and then the liquid was subjected to a centrifugal separator to separate microcapsules. In this way, microcapsules for red color were prepared. The microcapsules were dispersed in water at a concentration of 8 wt % to prepare ink.

The ink was used in a ink-jet printer equipped with a piezoelectric element (MJ800C, manufactured by Epson Corp.), and printing was carried out on a paper sheet of A4 size. After the printing, a thermal bar was passed above the paper sheet to decolor the printed information. When the recycled paper was stored at 60° C. for 30 hours, the printed information did not appear again, which revealed that the recycled paper sheet had a good storage stability. After the paper sheet was printed again, the printed surface was irradiated with light at 5000 lux for 300 hours. In this case, decrease in printing density was not higher than 10%.

Example 4

Microcapsules obtained in a similar method to that of the example 3 was dispersed in water at a concentration of 15 wt % to prepare ink for typographic printing.

A paper sheet of A4 size was printed with this ink in a common typographic printing process. Thereafter, a heat roller kept at 200° C. was made to contact with the sheet for two seconds to decolor the printed information. When printing and decoloring were repeated 30 times, also a blank paper sheet was finally obtained. The optical density (OD) of the blank paper sheet finally obtained was 0.15.

Example 5

Microcapsules were prepared in a similar method to that the example 3 except that one part by weight of Crystal Violet lactone (CVL) as a color former, two parts by weight of 2,4,4'-trihydroxybenzophenone as a developer and 20 parts by weight of pregnenolone as a decolorizer were used. The microcapsules were dispersed in water at a concentration of 8 wt % to prepare ink.

This ink was used in a ink-jet printer equipped with a piezoelectric element (MJ800C manufactured by Epson Corp.) to print on a paper sheet of A4 size. After the printing, a thermal bar was passed above the paper to decolor the printed information. When the recycled paper was stored at 60° C. for 30 hours, the printed information did not appear again, which revealed that the recycled paper sheet had a good storage stability. After the paper sheet was printed again, the printed surface was irradiated with light at 5000 lux for 300 hours. In this case, decrease in printing density was not higher than 10%.

Example 6

Two parts by weight of a colored composition consisting of PSD-150 (available from Nippon Soda Co. Ltd.) as a color former and 2,3,4,4'-tetrahydroxy-benzophenone as a developer at a ratio of 1 to 1, seven parts by weight of D-glucose as a decolorizer, three parts by weight of gelatin as a binder, and small amounts of isopropyl alcohol and a mildew inhibitor were added to water to prepare ink with a solid content of 10%. The color of the ink was black.

A paper sheet was printed with the ink with an ink-jet printer, and then the printed paper sheet was dried. When the paper sheet was heated by means of a thermal printer head (TPH) at a power of 0.35 mJ/dot or more, the printed information was able to be decolored. The decolored state was kept for 1000 hours at 40° C. without any change.

Examples 7 to 11

In the following Examples 7 to 11, 4.5 µm-thick PET film back-coated with thermosetting siliconeacrylic resin at a thickness of about 0.2 μm was used as a sheet substrate to prepare a printing sheet and a decoloring sheet. Printing and decoloring were carried out by using a thermal printer head with a pixel density of 8 dot/mm at a recording velocity of 10 ms/L.

Example 7

One part by weight of Crystal Violet lactone (CVL) as a color former, one part by weight of propyl gallate as a developer, 15 parts by weight of wax as a thermal transferring agent and 3 parts by weight of polystyrene as a binder resin were mixed followed by thermally melting to prepare an ink composition, and then the melt was applied on a surface of a sheet substrate with a bar coater at a thickness of about 2 μm to prepare a printing sheet.

One part by weight of 1,2-cyclohexanediol and one part by weight of methyl cholate as a decolorizer were mixed followed by thermally melting to prepare a decolorizer composition, and then the melt was applied on a surface of another sheet substrate by a bar coater at a thickness of about 3 μm to prepare a decoloring sheet.

Figure 10:
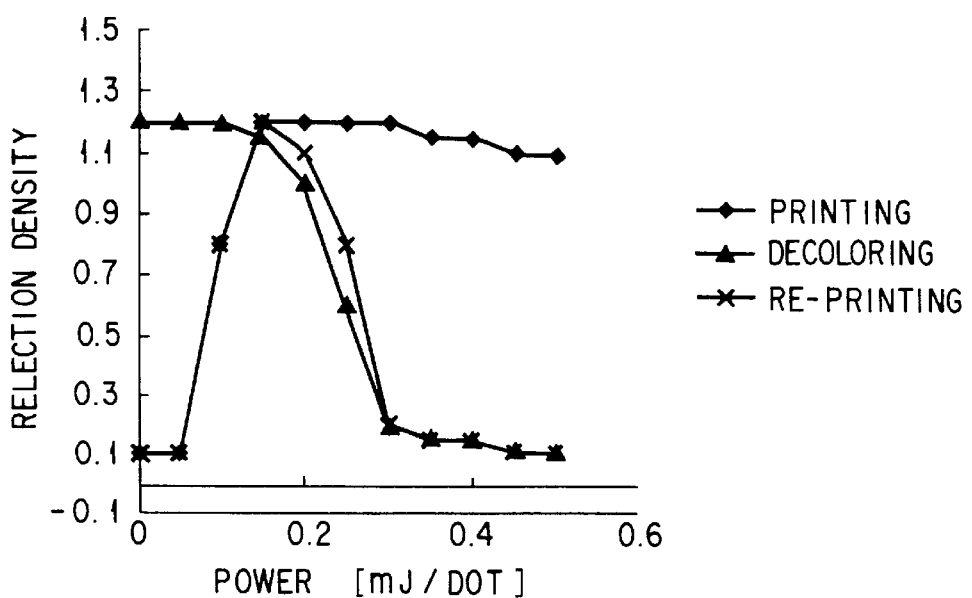
FIG. 10 is a graph showing a relationship between the TPH power and the refractive density obtained in Example 7 of the present invention.

Printing, decoloring and re-printing were carried out in the following manner with changing a TPH power, during which the reflection densities of a paper sheet were measured. The results are shown in FIG. 10.

When the printing sheet was put on a paper sheet and the ink composition was thermally transferred on the paper sheet by means of TPH, printing was effected stably at a power of 0.15 mJ/dot or more.

When the decoloring sheet was put on the printed paper sheet and the decolorizer composition was thermally transferred on the paper sheet by means of TPH, decoloring was effected at a power of 0.3 mJ/dot or more. This decolored state was maintained even for longer than 300 hours at 40° C.

When the printing sheet was put on the decolored paper sheet and the ink composition was thermally transferred again on the paper sheet by means of TPH, re-printing was effected at a power in the range of 0.15 to 0.2 mJ/dot, but re-printing was not able to be effected at a power of 0.3 mJ/dot or more.

Example 8

One part by weight of CVL as a color former, one part by weight of 2,4,4'-trihydroxybenzophenone as a developer, five parts by weight of metylandrostenediol as a reversible decolorizer, five parts by weight of 1-docosanol as a phase-separation accelerator and three parts by weight of styrene-methacrylic acid copolymer as a binder were mixed followed by thermally melted to prepare an ink composition, and then the melt was applied on a surface of a sheet substrate by means of a bar coater at a thickness of 2 μm to prepare a printing sheet. A decoloring sheet was prepared in a similar manner to that of the example 7.

Figure 11:
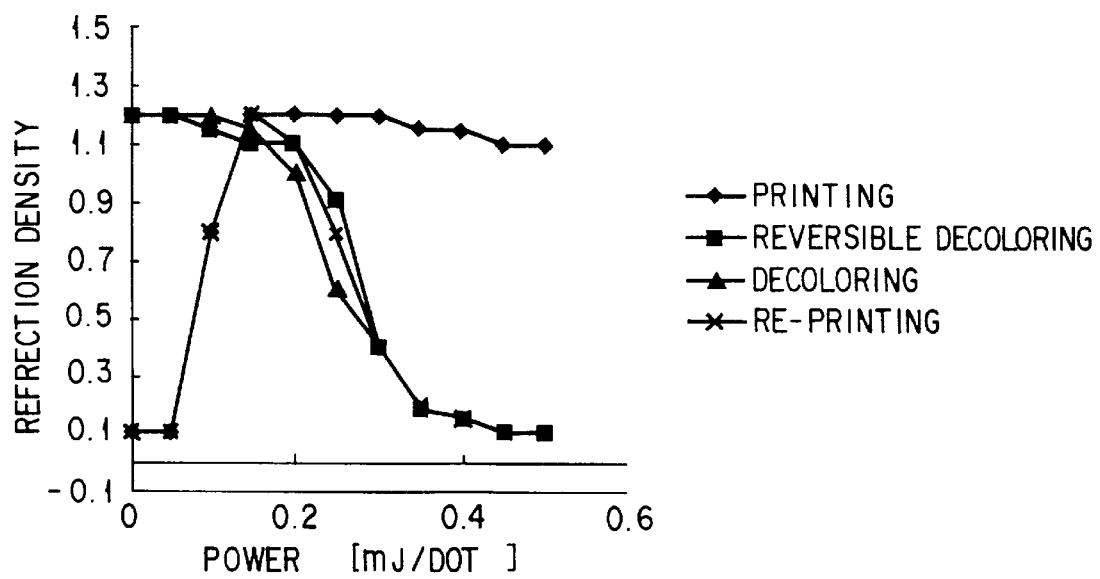
FIG. 11 is a graph showing a relationship between the TPH power and the reflection density obtained in Example 8 of the present invention.

Printing, reversible decoloring, complete decoloring and re-printing were carried out in the following manner with changing a TPH power, during which reflection densities of a paper sheet were measured. The results are shown in FIG. 11.

When the printing sheet was put on a paper sheet and the ink composition was thermally transferred on the paper sheet by means of TPH, printing was effected stably at a power of 0.15 mJ/dot or more.

When the printed portion on the paper sheet was heated by means of TPH, the printed portion was decolored at a power of 0.35 mJ/dot or more. When the decolored paper sheet was left at room temperature, the printed characters were restored to the originally printed state after 72 hours had passed.

When the decoloring sheet was put on the printed paper sheet and the decolorizer composition was thermally transferred on the paper sheet by means of TPH, decoloring was effected at a power of 0.35 mJ/dot or more. This decolored state was maintained even for longer than 1000 hours at 60° C. without any change.

When the printing sheet was put on the decolored paper sheet and the ink composition was thermally transferred again on the paper sheet by means of TPH, re-printing was able to be effected at a power in the range of 0.15 to 0.25 mJ/dot, but re-printing was not able to be effected at a power of 0.35 mJ/dot or more.

Example 9

One part by weight of ETAC (available from Yamada Chemical Co. Ltd.) as a color former, one part by weight of 2,4,4'-trihydroxybenzophenone as a developer, five parts by weight of methyl lithocholate as a compatible decolorizer and three parts by weight of polystyrene as a binder were mixed at a temperature where methyl lithocholate is not melted to prepare an ink composition, and then the ink composition was applied on a surface of a sheet substrate by means of a bar-coater at a thickness of 2 μm to prepare a printing sheet. β-Sitosterol as a reversible decolorizer and mixed alcohols containing mainly myricyl alcohol as a phase-separation accelerator were mixed at a ratio of 2 to 1 by weight followed by thermally melting to prepare a decolorizer composition, and then the melt was applied on a surface of another sheet substrate at a thickness of 2 μm by means of a bar-coater to prepare a decoloring sheet.

Printing, decoloring and re-printing were carried out in the following manner with changing a TPH power, during which the reflection densities of the paper sheet were measured. The results are shown in FIG. 12.

When the printing sheet was put on a paper sheet and the ink composition was thermally transferred on the paper sheet, printing was effected stably at a power of 0.10 mJ/dot or more. When the printed portion of the paper sheet was heated by means of TPH, it was not able to decolor the printed characters.

When the decoloring sheet was put on the printed paper sheet and the decolorizer composition was thermally transferred on the paper sheet by means of TPH, decoloring was effected at a power of 0.3 mJ/dot or more. The decolored state was not changed even after 300 hours had elapsed at 40° C.

When the printing sheet was put on the decolored paper sheet and the ink composition was thermally transferred again on the paper sheet, re-printing was effected at a power in the range of 0.15 to 0.2 mJ/dot. However, re-printing was not effected at a power of 0.3 mJ/dot or more.

Example 10

One part by weight of RED 40 (available from Yamada Chemical Co., Ltd.) as a color former, one part by weight of 2,3,4,4'-tetrahydroxybenzophenone as a developer and 10 parts by weight of 1,2-cyclohexanediol as a phase-separation inhibiting decolorizer were mixed by melting, and then the solid mixture was pulverized into fine powder with a particle size of 10 μm or less.

On the other hand, one part by weight of RED 40 as a color former, 2,3,4,4'-tetrahydroxybenzophenone as a developer and 10 part by weight of cholesterol as a reversible decolorizer were mixed by melting, and then the solid mixture was pulverized into fine powder with a particle size of 10 μm or less.

These two kinds of powder were mixed at a ratio of 1 to 1 by weight and the mixture was dispersed in an aqueous solution containing 5% gelatin at a solid content of 20% to prepare ink. The ink was then applied on a surface of a sheet substrate with a coating weight of about 3 g/m² by means of a bar-coater to prepare a printing sheet. In this example, no decoloring sheet was used.

FIG. 13 shows a relationship between the TPH power and the reflection density. When the printing sheet was put on a paper sheet and the ink composition was thermally transferred on the paper sheet by means of TPH, printing was effected at a power in the range of 0.10 to 0.3 mJ/dot, but printing was not effected at a power exceeding 0.3 mJ/dot.

When the printed portion of the printed paper was heated by means of TPH, it was unable to decolor the printed portion at a power in the range of 0.10 to 0.3 mJ/dot, but it was able to decolor the printed portion at a power exceeding 0.3 mJ/dot. The decolored state was maintained without any change for 300 hours at 40° C.

Example 11

One part by weight of CVL as a color former, one part by weight of propyl gallate as a developer and 10 parts by weight of cholesterol as a reversible decolorizer were melted to prepare a composition. Using a composition, microcapsules with a gelatin shell were prepared. Three parts by weight of the microcapsules and one part by weight of wax as a thermal transferring agent were mixed and the mixture was applied on a sheet substrate by means of a hot-melt coater to prepare a printing sheet.

The printing sheet was put on a paper sheet and then the ink composition was thermally transferred on the paper sheet at a power of 0.15 mJ/dot by means of TPH to print such a phrase as "STORAGE POSSIBLY IMPROPER". The printed paper was heated at 60° C. to decolor the characters temporarily.

When the decolored paper was stored in a refrigerator at 10° C., the printed characters did not appear even after 240 hours had passed. However, when the decolored paper was left in a room at 25° C., the printed characters appeared after 10 hours had passed. Similarly, in the condition of 35° C., the characters appeared after two hours had passed. Therefore, the ink of the present invention can be applicable as a thermal history sensor in the use such as quality control of fresh foods.

A temperature at which printing with an ink of the present invention is restored, after it is printed and then decolored temporarily, is controllable by selecting material having a proper glass transition point. Glass transition point Tg and melting point Tm of typical reversible decolorizers are shown in Table 1. Moreover, coloring speed of ink in the vicinity of the above mentioned temperatures were controlled by addition of a phase-separation accelerator or selection of a proper developer.

TABLE 1

| No. | decolorizer | Tg | Tm |
|---|---|---|---|
| 1 | 1,2:5,6-diisopropylidene-D-mannitol | 2° C. | 106° C. |

TABLE 1-continued

| No. | decolorizer | Tg | Tm |
|---|---|---|---|
| 2 | pregnenolone acetate | 15° C. | 140° C. |
| 3 | Δ-androstene-3,17-dione | 22° C. | 130° C. |
| 4 | cholesterol | 28° C. | 137° C. |
| 5 | lanosterol | 33° C. | 131° C. |
| 6 | 5α-pregnan-3β-ol-20-one | 37° C. | 182° C. |
| 7 | pregnenolon | 44° C. | 183° C. |
| 8 | estradiol benzoate | 50° C. | 188° C. |
| 9 | 5a-pregnen-3β, 17-diol diacetate | 53° C. | 196° C. |
| 10 | methylandrostenediol | 65° C. | 197° C. |
| 11 | heckogenin | 80° C. | 250° C. |
| 12 | rockogenin | 92° C. | 201° C. |

Example 12

One part by weight of CVL as a color former, one part by weight of propyl gallate as a developer, 10 parts by weight of cholesterol as a reversible decolorizer, three parts by weight of wax as a thermal transferring agent, five parts by weight of polystyrene as a binder, and small amounts of hydrophobic quartz filler in the form of ultra-fine powder and a charge control agent were melted and then solidified. The solid product was crushed and further pulverized into fine particles with an average size of 10 μm to prepare toner. A decoloring sheet was prepared in a similar manner to that of the example 7.

The toner was fed to a copy machine (FC210 manufactured by Cannon Inc.) and characters were copied on a paper sheet. They were fixed stably.

When the decoloring sheet was put on the copied paper and then the decolorizer was thermally transferred by means of THP, decoloring was effected at a power of 0.3 mJ/dot or more. The decolored state was unchanged even after 300 hours had elapsed at 40° C.

Example 13

One part by weight of ETAC (made by Yamada Chemical Co., Ltd.) as a color former, one part by weight of 2,4,4'-trihydroxybenzophenone as a developer, 10 parts by weight of heckogenin as a reversible decolorizer, three parts by weight of mixed alcohols rich in myricyl alcohol as a phase-separation accelerator, five parts by weight of styrenemethacrylic acid copolymer as a binder, and small amounts of hydrophobic quartz filler in the form of ultra-fine powder and a charge control agent were melted and then solidified. The solid product was crushed and further pulverized into fine particles with an average size of 10 μm to prepare toner. A decoloring sheet was prepared in a similar manner to that of the example 7.

The toner was fed into a copy machine (FC210 manufactured by Canon Inc.) and characters were copied on a paper sheet. The characters were fixed on the paper sheet stably.

When the copied portion of the paper sheet was heated by means of TPH at a power of 0.35 mJ/dot or more, it was able to decolor the copied characters. The decolored characters did not appear at room temperature, but they appeared at 40° C. after 3 weeks had passed, and at 135° C. at an elapsed time of 0.2 seconds.

When the decoloring sheet was put on the copied paper and then the decolorizer was thermally transferred by means of THP, decoloring was effected at a power of 0.35 mJ/dot or more. The decolored state was unchanged even after 1000 hours had elapsed at 60° C.

In the following Examples 14 to 55, 500 BLATT (available from Neusiedler, pH=9.4) was used as a plain paper sheet for forming an image. This paper sheet has a reflection density of 0.07.

Example 14

Figure 14:
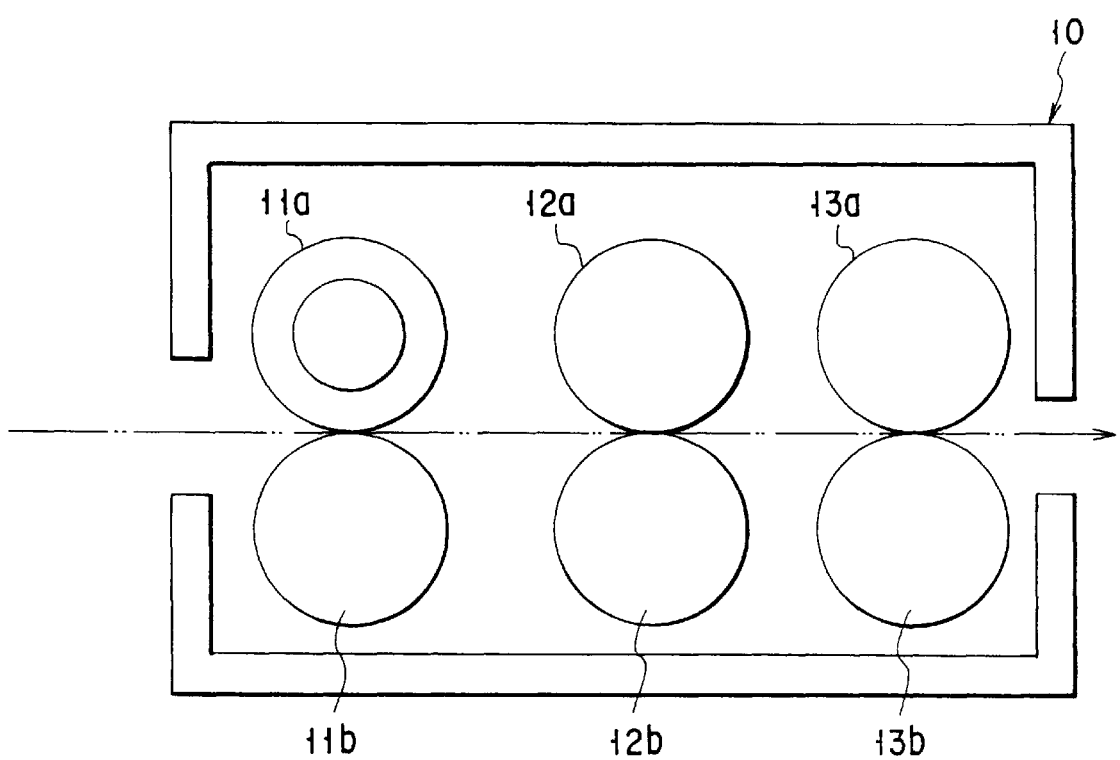
FIG. 14 shows a heating type image decoloring apparatus of the present invention.

FIG. 14 shows an example of heating type decoloring apparatus. The apparatus comprises a pair of a heat roller 11a and a counter roller 11b, another pair of a first surface roughening roller 12a and a counter roller 12b, and still another pair of a second surface roughening roller 13a and a counter roller 13b, which are arranged in this order as seen from the inlet port. These first and second surface roughening rollers 12a and 13a differ from each other in the surface roughness. These surface roughening rollers in the simplest form can be prepared by detachably mounting a sand paper to the surface of each of these rollers. The surface roughening roller of this type can be miniaturized so as to be used in an office.

A paper sheet, which is fed into the apparatus with a surface having an image formed thereon facing upward, is heated by the heat roller 11a and, then, roughened by the first and second surface roughening rollers 12a, 13a. As a result, light is scattered on the surface of the image forming material so as to decrease the light reflection, making it impossible to recognize whether or not the image forming material remains on the surface of the paper sheet.

Example 15

Figure 15:
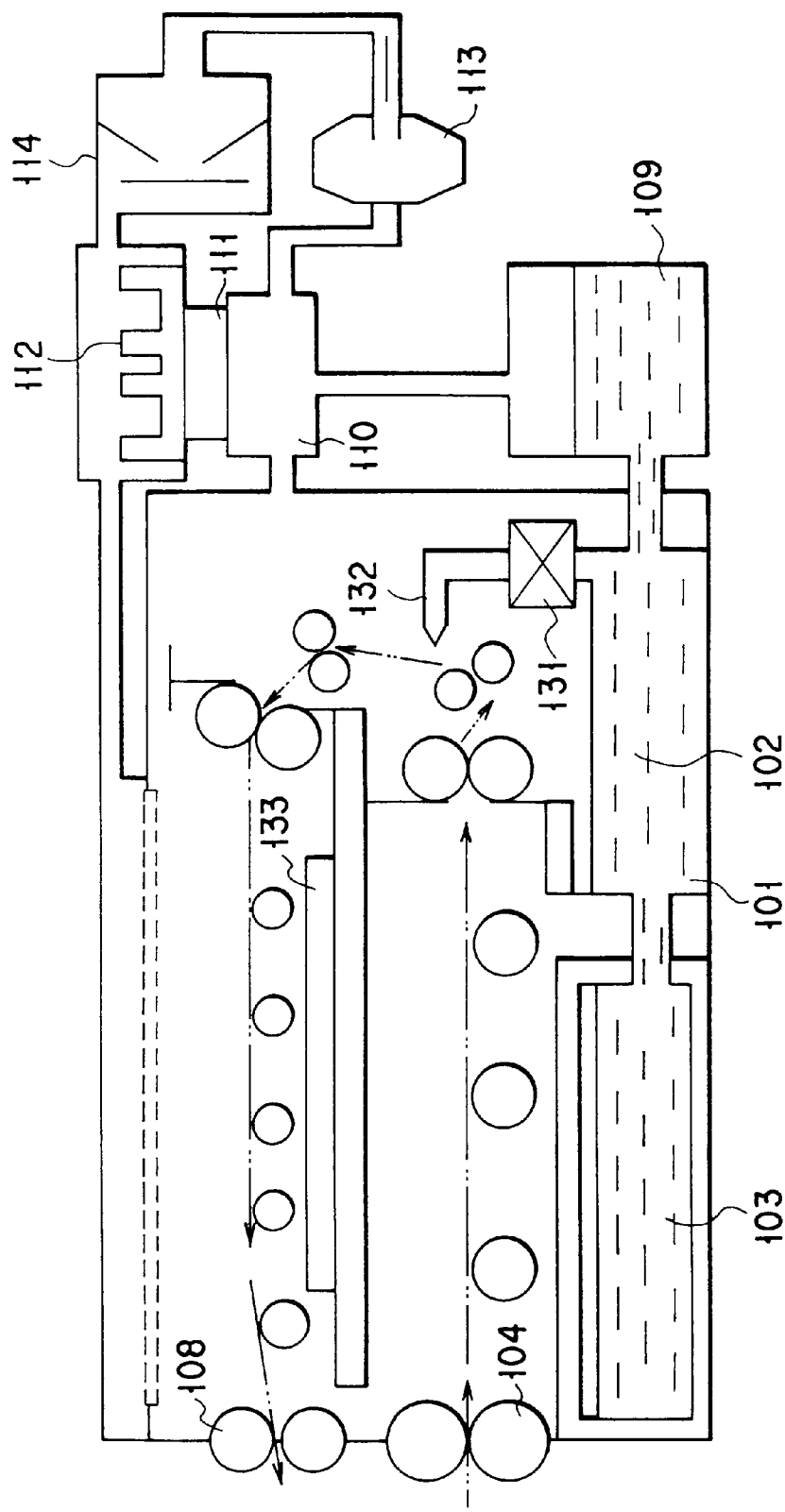
FIG. 15 shows a solvent type image decoloring apparatus of the present invention.

FIG. 15 shows an example of a solvent type decoloring apparatus. A solvent container 101 and a solvent tank 103 for supplying a solvent 102 (for example, ethyleneglycol diethyl ether) into the solvent container 101 are arranged in a bottom portion of the apparatus. Paper sheets each having an image formed thereon is fed one by one with the formed image facing downward by a transfer roller 104 into the apparatus and, then, transferred by carrier rollers. The paper sheet is transferred through a clearance between a immersing roller 105 and counter rollers 106. During the transfer, the paper sheet is immersed in the solvent 102 housed in the solvent container 101 so as to have the formed image decolored. The paper sheet is further transferred into an upper region of the apparatus by carrier rollers so as to be exposed to a hot air generated from a radiator of an electronic cooler described herein later and, then, heated by a heat roller 107 so as to be smoothed. After removal of the solvent, the paper sheet is transferred by a transfer roller 108 out of the apparatus so as to be housed in a stocker. It is possible for the transfer rollers 104 and 108 to be equipped with electric switches to permit these rollers to be operated or stopped when the paper sheet is transferred into and out of the decoloring apparatus. It is desirable for each roller to be formed of a material resistant to a solvent and producing an antistatic effect.

In the decoloring apparatus shown in FIG. 15, the paper sheet is immersed in the solvent 102 housed in the solvent container 101. Naturally, the solvent can be supplied in an amount large enough to achieve the decoloring to the paper sheet regardless of the amount of the image forming material on the paper sheet. Also, the decolored state can be maintained stable, making it possible to reuse the paper sheet effectively. It should also be noted that, if the surface of the image forming material on the paper sheet is roughened by the counter roller 108, the quality of the decolored paper sheet can be improved.

The apparatus comprises a solvent recovery mechanism. The recovery mechanism comprises mainly a recovery vessel in which are housed an adsorbent 110, an electronic cooler 111, and a circulation pump 114. The used solvent is recovered from the solvent container 101 into a recovered solvent container 109. The solvent evaporated in the recovered solvent container 109 is adsorbed on the adsorbent 110 cooled by the electronic cooler 111, e.g., a Peltier element. The temperature of the electronic cooler 111 is set to permit the vapor pressure of the solvent to be 100 ppm or less. The solvent adsorbed on the absorbent 110 is sucked by a circulation pump 114 so as to be absorbed by an absorption filter 113. It is desirable to use an orifice pump excellent in resistance to explosion as the circulation pump. It is possible to prevent the pump material from being corroded by the solvent by arranging the absorption filter 113 upstream of the circulation pump 114. It is also possible to use a dehumidifier in order to prevent the water within the atmosphere from entering the system. The hot air generated from the radiator 112 of the electronic cooler 111 is utilized for drying the paper sheet after immersing in the solvent as described previously. The apparatus of the type shown in FIG. 15 can be miniaturized so as to be used in an office.

Example 16

Figure 16:
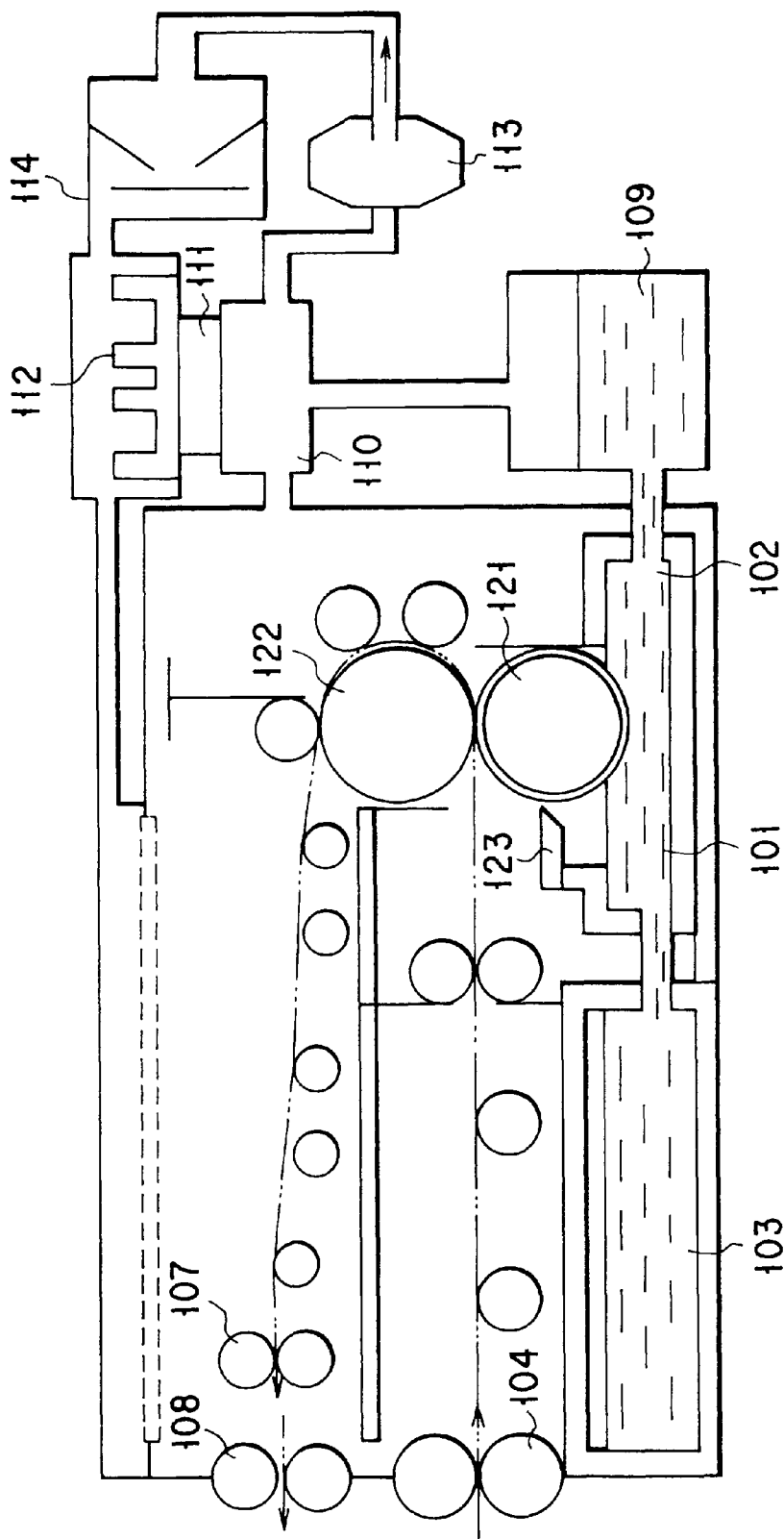
FIG. 16 shows another solvent type image decoloring apparatus of the present invention.

FIG. 16 shows another example of a solvent type decoloring apparatus. The decoloring apparatus shown in FIG. 16 is substantially equal in construction to the apparatus shown in FIG. 15, except that a gravure roller 121 is used in the apparatus of FIG. 16 for bringing a solvent into contact with the image forming material on the paper sheet. The gravure roller 121 is rotated so as to be immersed in the solvent 102 housed in the solvent container 101 and, then, the amount of the solvent attached to the surface is controlled by a blade 123. When the paper sheet fed into the apparatus is passed through the clearance between the gravure roller 121 and the counter roller 122, the solvent (for example, n-pentyl lactate) is supplied by the gravure roller 121 to the paper sheet so as to achieve decoloration.

In the apparatus shown in FIG. 16, the smallest amount of the solvent required for the decoloration is supplied by the gravure roller 121 onto the paper sheet, making it possible to shorten the time required for removing the solvent from the paper sheet. As a result, the process rate of the paper sheet is improved. Also, since the image forming material remaining on the paper sheet is roughened by the rubbing with the gravure roller, the quality of the decolored paper sheet is improved.

Example 17

Figure 17:
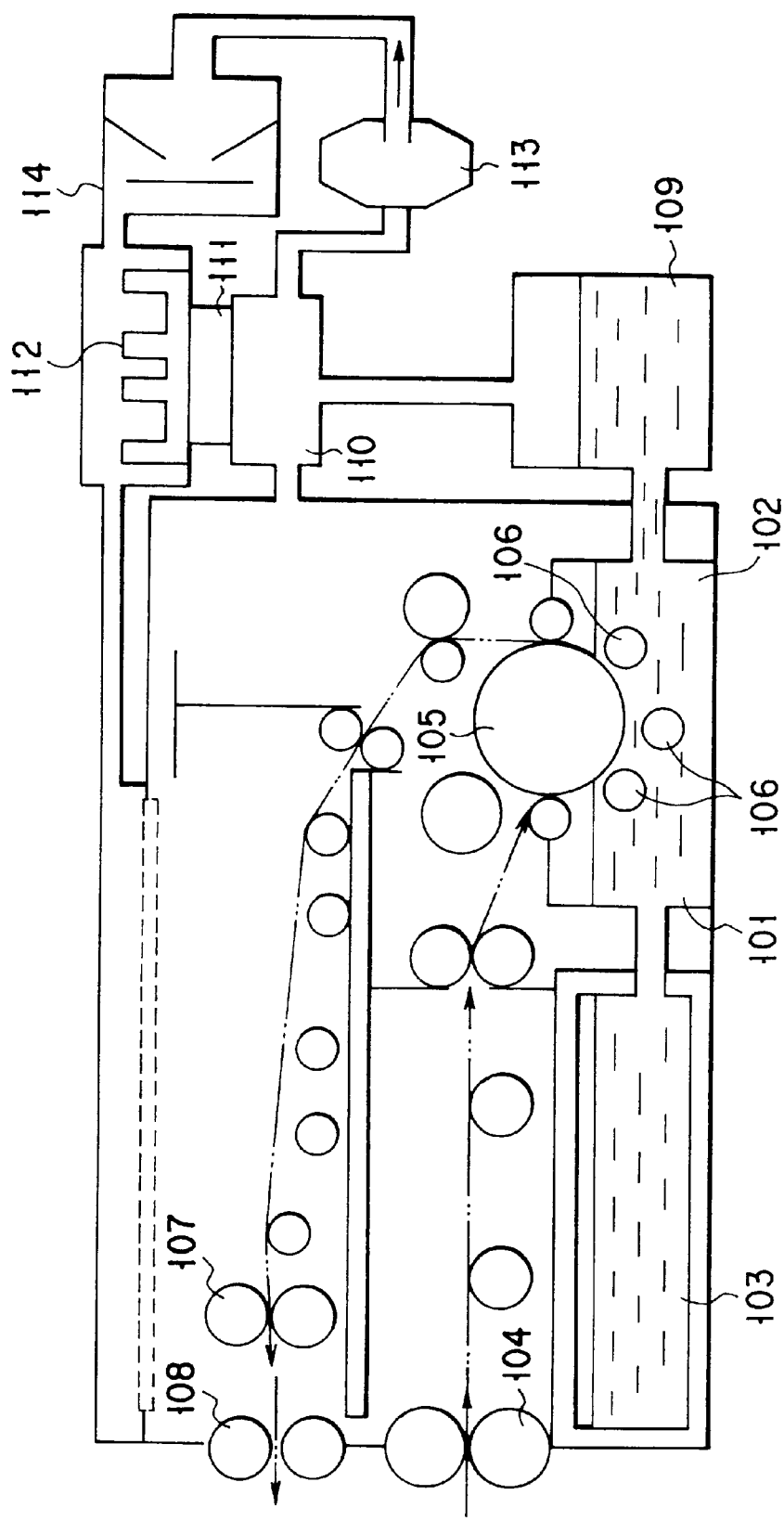
FIG. 17 shows another solvent type image decoloring apparatus of the present invention.

FIG. 17 shows another example of a solvent type decoloring apparatus. The decoloring apparatus shown in FIG. 17 is substantially equal in construction to the apparatus shown in FIG. 15, except that the apparatus shown in FIG. 17 comprises a pump 131 and a spray nozzle 132 as a means for bringing the solvent into contact with the image forming material on the paper sheet, and a lamp heater 133 for removing the solvent from the paper sheet. In the apparatus shown in FIG. 17, the solvent 102 is pumped out by the pump 131 from the solvent container 101 so as to be sprayed onto the paper sheet from the nozzle 132, thereby to achieve decoloration. Then, the paper sheet is dried by a hot air and, at the same time, heated by the lamp heater 133 so as to remove the solvent from the paper sheet.

In the apparatus shown in FIG. 17, a sufficiently large amount of the solvent can be supplied by the pump 131 onto the paper sheet. In addition, the lamp heater 133 permits improving the solvent removing rate from the paper sheet. It follows that the apparatus shown in FIG. 17 is superior to the apparatus shown in FIGS. 15 or 16 in the paper sheet processing rate. What should also be noted is that the solvent flows down along the surface of the paper sheet so as to spread the image forming material. As a result, the quality of the decolored paper sheet is improved.

Example 18

Figure 18A:
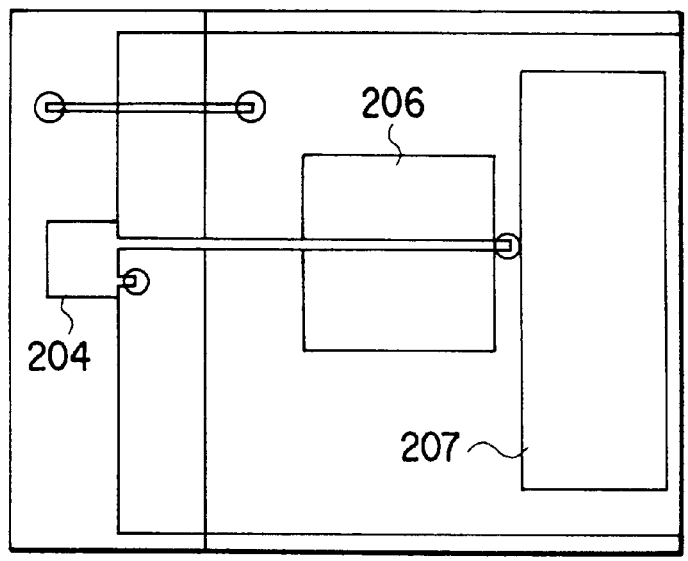
FIGS. 18A to 18C show another solvent type image decoloring apparatuses of the present invention.
Figure 18B:
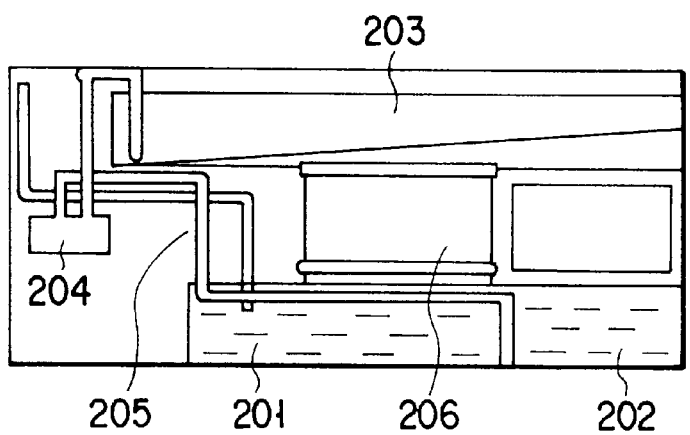
Figure 18C:
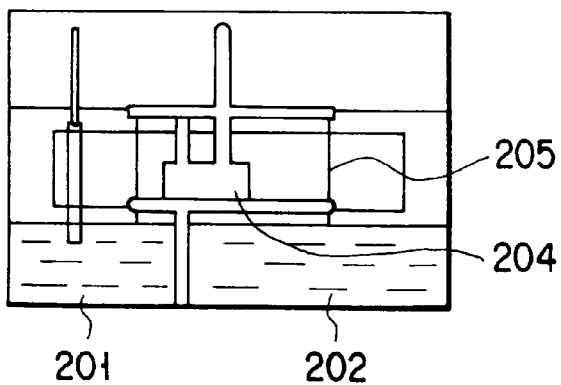

FIGS. 18A to 18C collectively exemplifies a batch type decoloring apparatuses. FIG. 18A is a plan view of the apparatus, with FIGS. 18B and 18C being side views. As shown in the drawings, a solvent 202 is housed in a solvent tank 201 arranged in a bottom portion of the apparatus. A solvent immersing vessel 203 is arranged in an upper portion of the apparatus. A chemical pump 204 and a pipe 205 connected to the chemical pump 204 are arranged between the solvent tank 201 and the solvent immersing vessel 203. Further, an electronic cooler 206, e.g., a Peltier element, is arranged below the solvent immersing vessel 203 such that a radiator of the electronic cooler 206 faces upward. An electric power is supplied from a power source 207 to the electronic cooler 206.

For performing the decoloration, a lid of the solvent immersing vessel 203 is opened, and a bundle of, for example, 100 paper sheets is put in the vessel 203. Under this condition, the chemical pump 204 is operated to supply the solvent 202 from the solvent tank 201 into the solvent immersing vessel 203 so as to immerse the paper sheets in the solvent for the decoloring purpose. Then, the chemical pump 204 is operated again to cause the solvent to flow from the solvent immersing vessel 203 back to the solvent tank 201. Further, the solvent is removed from the paper sheet by utilizing the heat radiated from the electronic cooler 206. The paper sheets thus decolored can be used again effectively. It is also possible to use the recovered paper sheets for manufacturing regenerated paper sheets. Further, the evaporated solvent can be cooled by the electronic cooler 206 for recovering the solvent. Incidentally, a heat exchanger can be used in place of the electronic cooler shown in FIG. 18. The apparatus shown in FIG. 18 is capable of processing the paper sheets on the order of 100 kg/day.

Example 19

Figure 19:
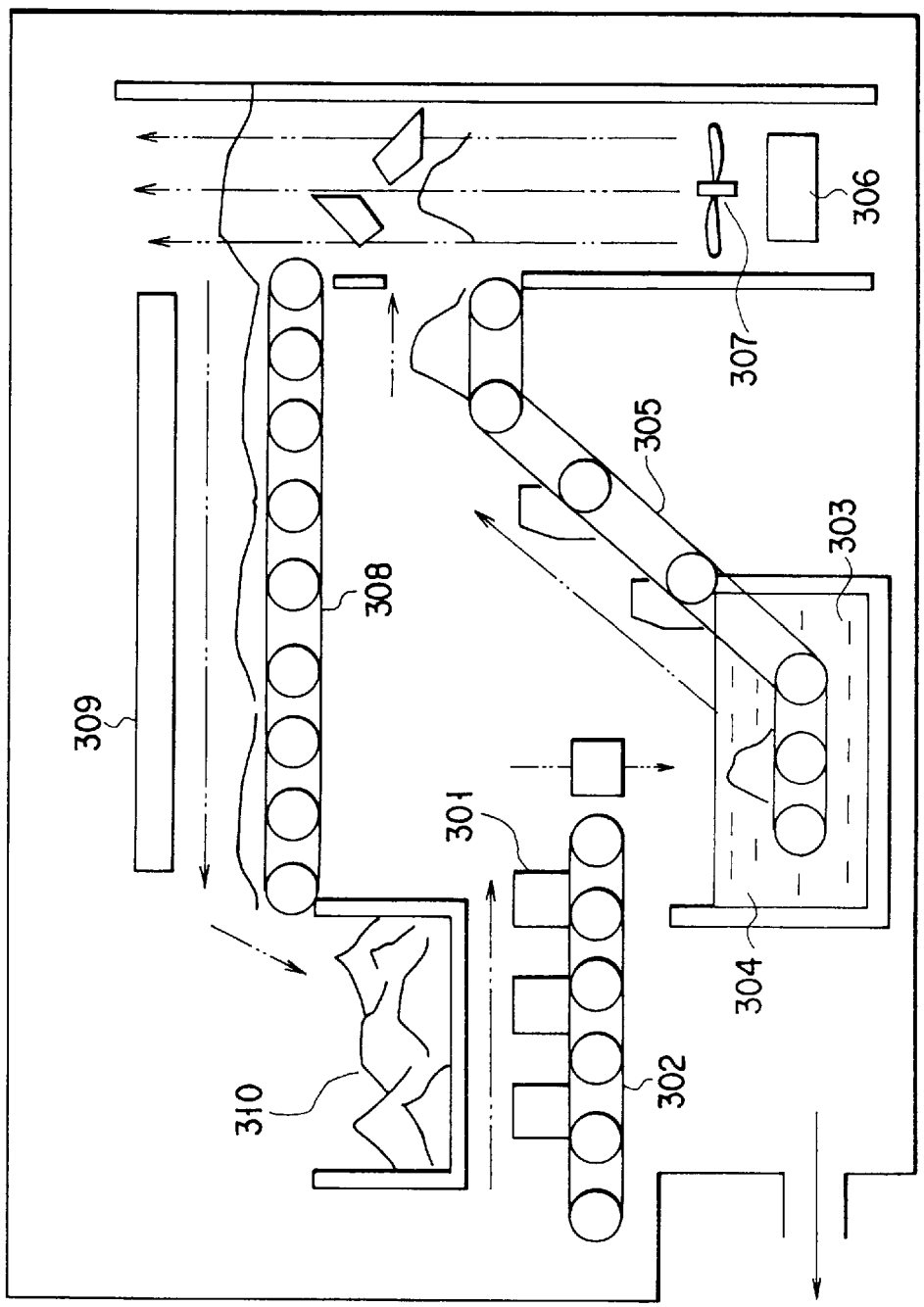
FIG. 19 shows still another solvent type image decoloring apparatus of the present invention.

FIG. 19 exemplifies an in-line type large plant using a solvent. In this plant, bundles 301 of paper sheets are transferred by a belt conveyor 302 into a solvent processing vessel 303 so as to be immersed in a solvent 304 for the decoloring purpose. The bundles 301 of the paper sheets are taken out of the solvent processing vessel 303 by a belt conveyor 305 so as to be transferred into a primary drying station in which these paper sheets are exposed to a hot air generated from a heater 306 and blown by a fan 307. As a result, these paper sheets are scattered and dried and, then, transferred into a secondary drying station in which these paper sheets are transferred by a belt conveyor 308. During the transfer in the secondary drying station, the scattered paper sheets are completely dried by an infrared heater 309. The dried paper sheets are stored in a stock room 310. In this apparatus, the recovered paper sheets can be effectively used again. It is also possible to use the recovered paper sheets for manufacturing regenerated paper sheets. It should be noted that the evaporated solvent generated from the entire plant is recovered in a fractionator (not shown) so as to be used again as a decoloring solvent in the solvent processing vessel. The apparatus of this type is capable of processing paper sheets in an amount of scores of tons/day.

In a plant of the type shown in FIG. 19, it is desirable to use a solvent for its own use. For example, it is desirable to use a mixed solvent consisting of a ketone type solvent exhibiting a high decoloring rate and toluene that is a good solvent for the binder. Further, a decolorizer should desirably be added to the mixed solvent noted above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for processing paper sheets to decolor an image formed thereon, comprising:
    a vessel configured to hold a bundle of paper sheets, on at least one of which a decolorizable image forming material is formed, the decolorizable image forming material comprising a color former, a developer and a decolorizer;
    a decoloring solvent tank;
    a pump supplying a decoloring solvent from the decoloring solvent tank to the vessel to decolor the image, and sucking the decoloring solvent out of the vessel to the decoloring solvent tank; and
    a Peltier element disposed between the vessel and the decoloring solvent tank, the Peltier element heating the vessel and cooling the decoloring solvent tank simultaneously.

2. The apparatus according to claim 1, wherein the vessel comprises a lid.

3. The apparatus according to claim 1, wherein the decoloring solvent tank contains a solvent selected from the group consisting of ethers, ketones and esters.

4. The apparatus according to claim 1, wherein the decolorizer comprises a highly amorphous phase separation inhibitor and a slightly amorphous phase separation inhibitor.

* * * * *

UNITED STATES PATENT AND TRADEMARK OFFICE
CERTIFICATE OF CORRECTION

PATENT NO.   : 6,375,742 B2
DATED        : April 23, 2002
INVENTOR(S)  : Sano et al.

It is certified that error appears in the above-identified patent and that said Letters Patent is hereby corrected as shown below:

<u>Title page,</u>
Item [30], Foreign Application Priority Data, should read:
-- [30]         Foreign Application Priority Data
    Jul. 25, 1996    (JP) …………………………….. 8-196191
    Jan. 23, 1998    (JP) …………………………….. 10-011653 --

Signed and Sealed this

Fourth Day of May, 2004

JON W. DUDAS
*Acting Director of the United States Patent and Trademark Office*